(12) United States Patent
Jung et al.

(10) Patent No.: US 12,393,285 B2
(45) Date of Patent: Aug. 19, 2025

(54) IMAGE DISPLAY APPARATUS INCLUDING A DISPLAY MODE AND A POINTER LIGHT SENSING MODE, AND VIDEO WALL INCLUDING THE SAME

(71) Applicant: LG ELECTRONICS INC., Seoul (KR)

(72) Inventors: Woosik Jung, Seoul (KR); Wonsik Kim, Seoul (KR); Sungjin Kang, Seoul (KR); Bongseok Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/657,643

(22) Filed: May 7, 2024

(65) Prior Publication Data
US 2025/0013317 A1 Jan. 9, 2025

(30) Foreign Application Priority Data
Jul. 4, 2023 (KR) .................. 10-2023-0086340

(51) Int. Cl.
*G06F 3/03* (2006.01)
*G06F 3/033* (2013.01)
*G09G 3/32* (2016.01)

(52) U.S. Cl.
CPC ............ *G06F 3/0304* (2013.01); *G06F 3/033* (2013.01); *G09G 3/32* (2013.01);
(Continued)

(58) Field of Classification Search
CPC ............... G06F 3/0304; G06F 3/1446; G09G 2300/026; G09G 2300/06; G09G 2310/08;
(Continued)

(56) References Cited

U.S. PATENT DOCUMENTS

| 2004/0012565 A1* | 1/2004 | Cok ............... G06F 3/0412 345/158 |
| 2010/0171717 A1* | 7/2010 | Hu ............... G06F 3/0412 345/173 |

(Continued)

FOREIGN PATENT DOCUMENTS

| JP | 3999887 B2 * | 10/2007 |
| KR | 1020030065398 | 8/2003 |
| KR | 1020180059634 | 6/2018 |

OTHER PUBLICATIONS

JP-3999887-B2, English translation of the cited Foreign Patent document (Year: 2007).*

(Continued)

*Primary Examiner* — Benjamin C Lee
*Assistant Examiner* — Nathan P Brittingham
(74) *Attorney, Agent, or Firm* — LEE, HONG, DEGERMAN, KANG & WAIMEY

(57) ABSTRACT

The present disclosure relates to an image display apparatus and a video wall including the same. The image display apparatus according to an embodiment of the present disclosure includes: a panel including a plurality of light emitting diodes; and a driving controller configured to output a scan signal to the plurality of light emitting diodes for each of a plurality of subframe periods, in which the driving controller outputs a scan signal and a data signal to the light emitting diode during the plurality of subframe periods in a first mode corresponding to a display mode, and outputs only any one of the scan signal and the data signal during some subframe periods among the plurality of subframe periods in a second mode for sensing a pointer light. Accordingly, the pointer light can be stably sensed without a separate optical sensor.

18 Claims, 33 Drawing Sheets

(52) U.S. Cl.
CPC ... *G09G 2300/026* (2013.01); *G09G 2300/06* (2013.01); *G09G 2310/08* (2013.01); *G09G 2330/022* (2013.01); *G09G 2330/023* (2013.01); *G09G 2354/00* (2013.01); *G09G 2360/14* (2013.01)

(58) Field of Classification Search
CPC ....... G09G 2330/022; G09G 2330/023; G09G 2354/00; G09G 2360/14
See application file for complete search history.

(56) References Cited

U.S. PATENT DOCUMENTS

2016/0370915 A1\* 12/2016 Agarwal ............... G06F 3/0443
2018/0151656 A1\* 5/2018 Choo ................. H10K 59/1213
2023/0316988 A1\* 10/2023 Hofrichter ............... G09G 3/32
345/55

OTHER PUBLICATIONS

Korean Intellectual Property Office Application No. 10-2023-0086340, Office Action dated May 17, 2024, 6 pages.

\* cited by examiner

FIG. 6

FIG. 7A
(a) 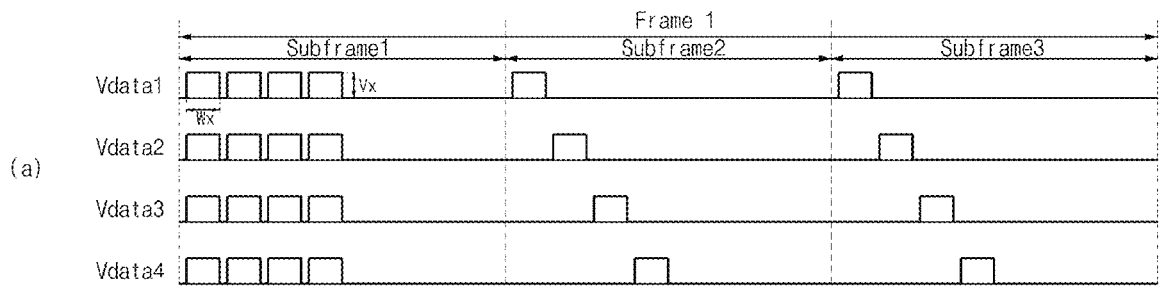
(b) 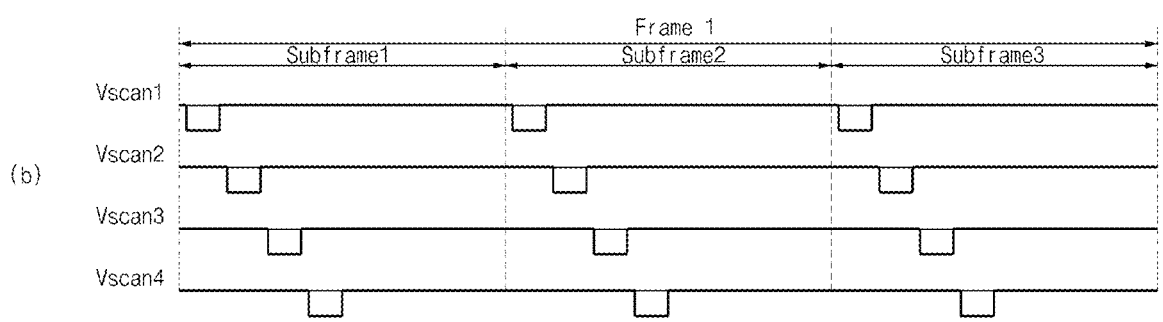
(c) 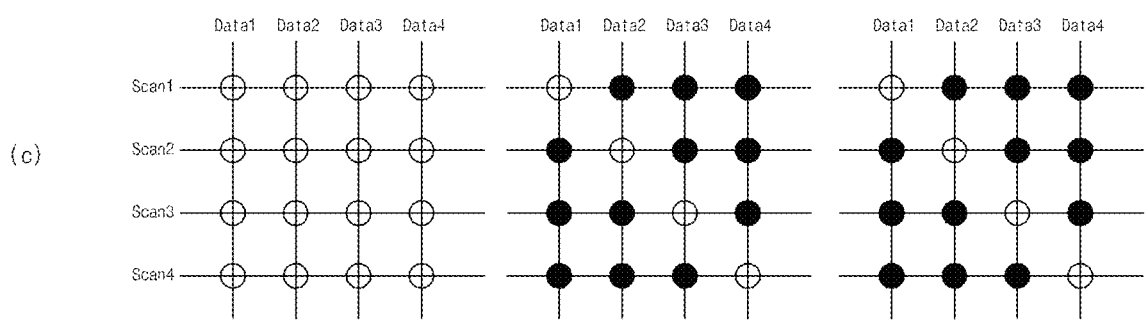

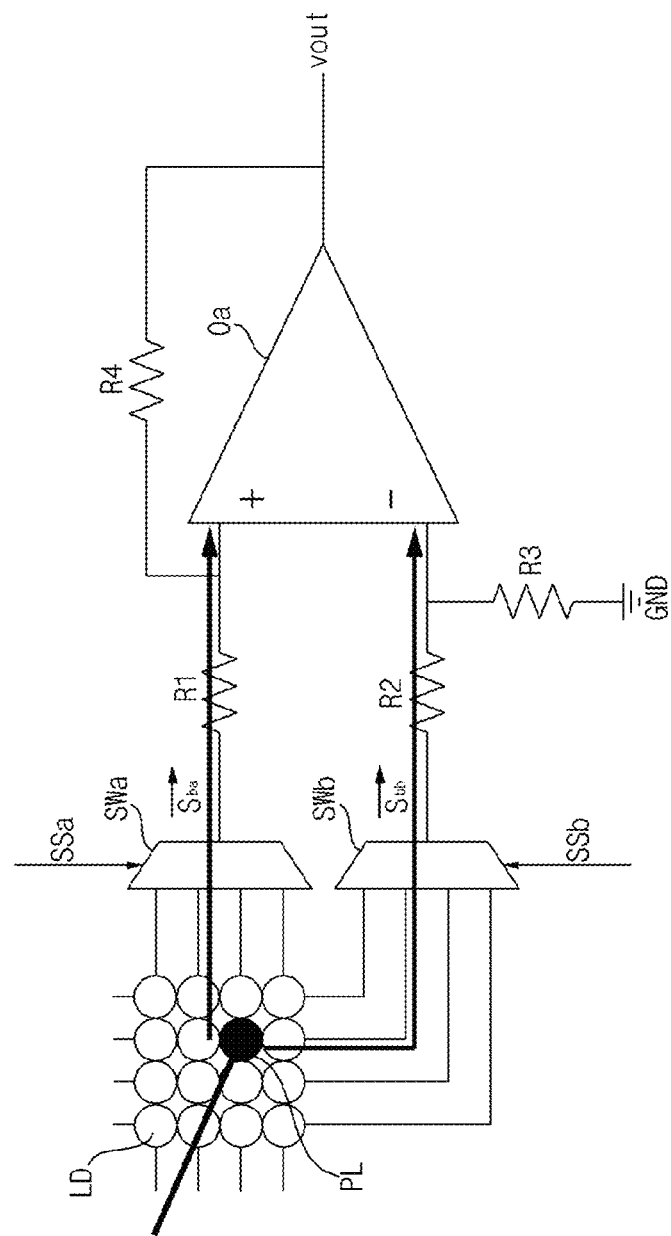

FIG. 11A
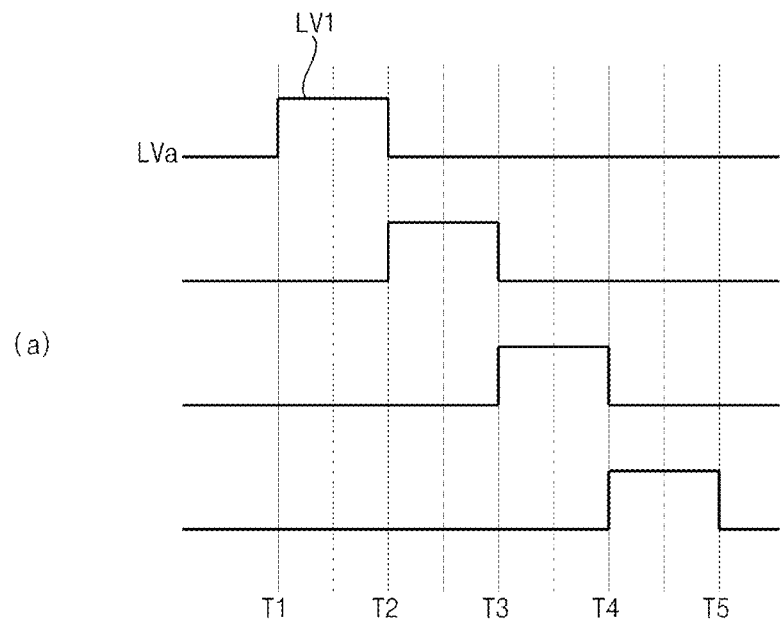
(a)
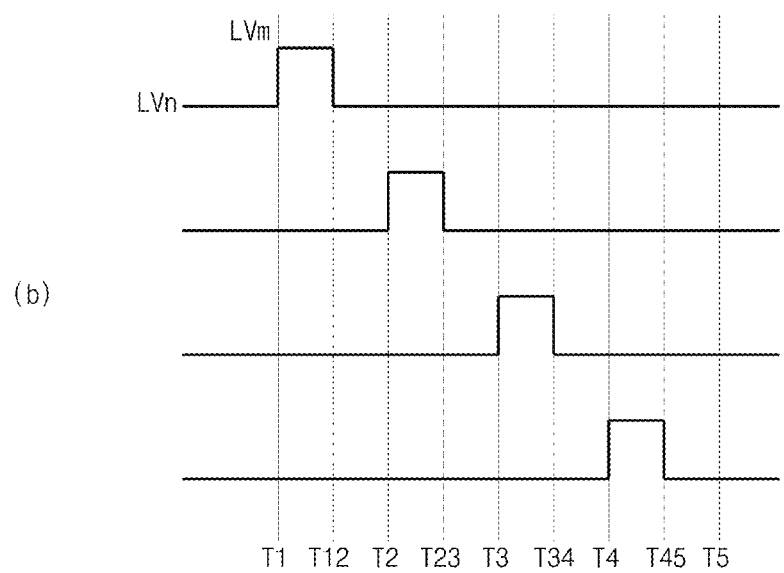
(b)

FIG. 11D
(a) 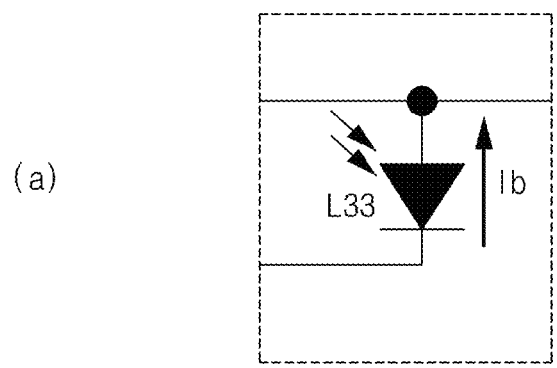
(b)
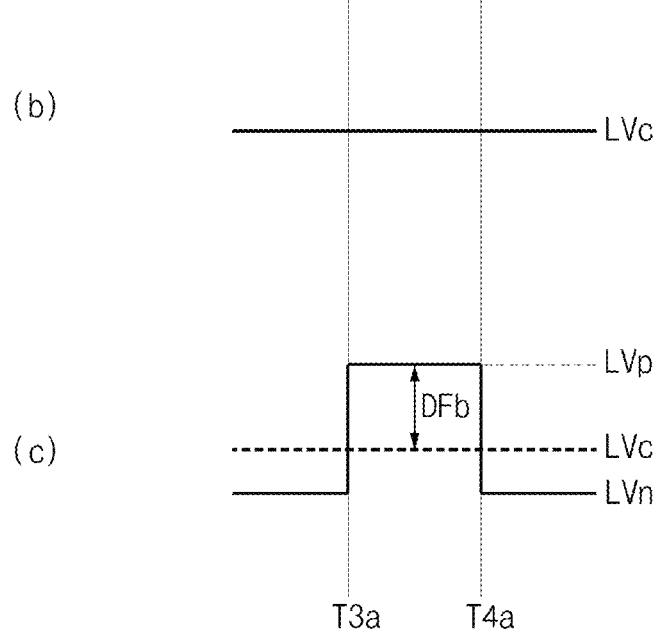

FIG. 12B
(a) 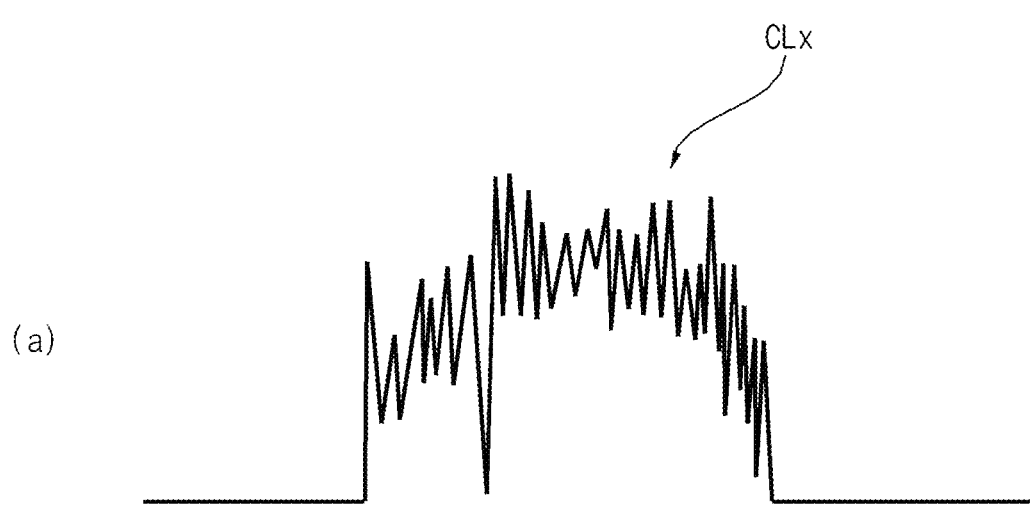
(b) 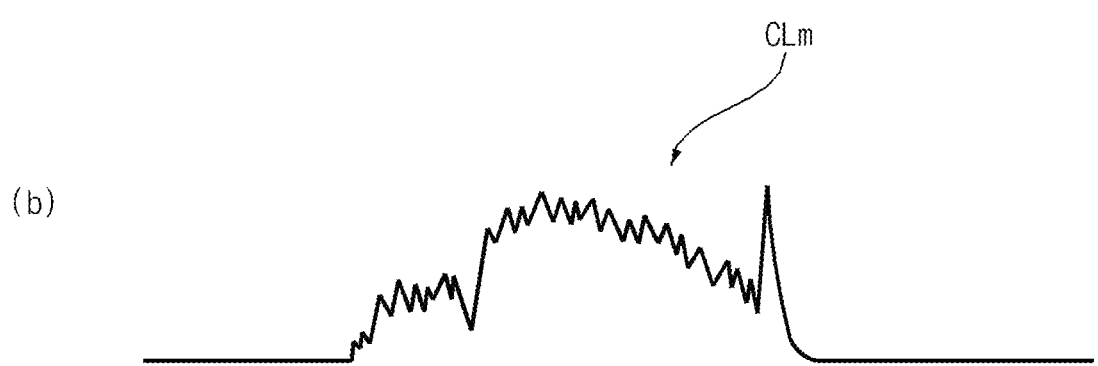

FIG. 13C
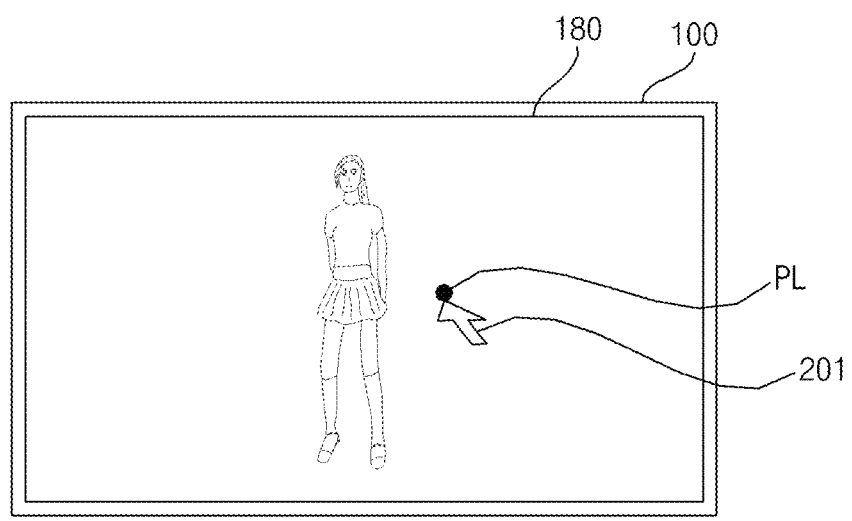
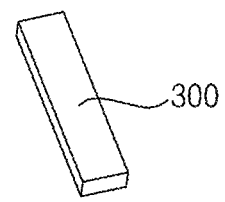

FIG. 13E
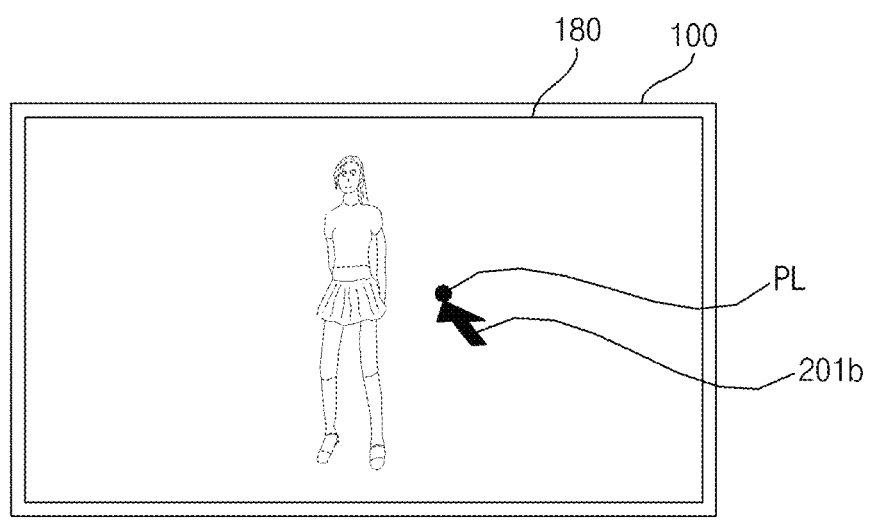
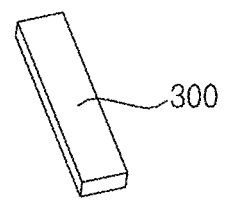

FIG. 14C
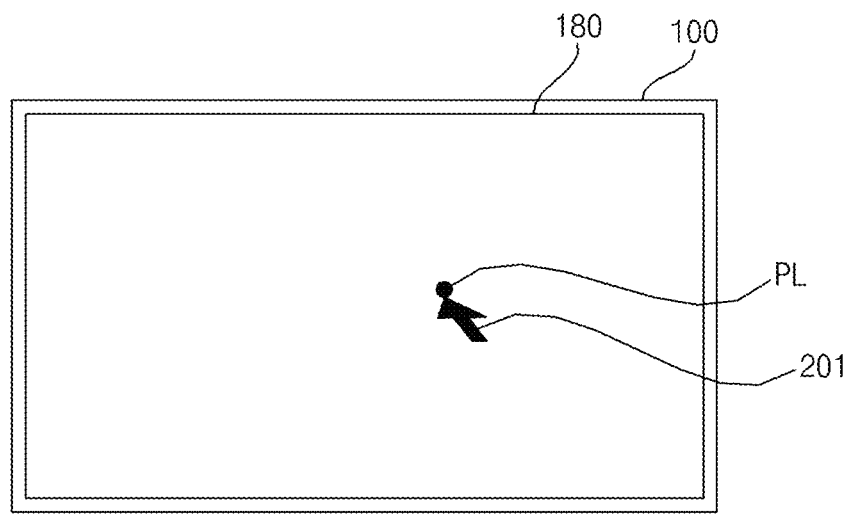
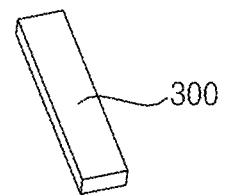

IMAGE DISPLAY APPARATUS INCLUDING A DISPLAY MODE AND A POINTER LIGHT SENSING MODE, AND VIDEO WALL INCLUDING THE SAME

CROSS-REFERENCE TO RELATED APPLICATION(S)

Pursuant to 35 U.S.C. § 119, this application claims the benefit of earlier filing date and right of priority to Korean Application No(s). 10-2023-0086340, filed on Jul. 4, 2023, the contents of which are all incorporated by reference herein in its entirety.

BACKGROUND

1. Field

The present disclosure relates to an image display apparatus, and a video wall including the same, and more particularly, to an image display apparatus capable of stably sensing a pointer light without a separate optical sensor, and a video wall including the same.

2. Description of the Related Art

An image display apparatus is an apparatus with a display that displays images.

Various types of displays are used in the image display apparatus, including a liquid crystal display panel, a light emitting diode panel, etc.

For a light emitting diode panel-based image display apparatus, an active matrix driving scheme or a passive-matrix driving scheme is used in order to drive the light emitting diode panel.

When driving the light emitting diode panel-based image display apparatus based on the passive-matrix driving scheme, light emitting diodes are made to emit light or not by using a plurality of subframes.

Meanwhile, since the display apparatus including the light emitting diode should include a separate optical sensor in order to sense an external pointer light, there is a disadvantage in that panel implementation in the display apparatus is complicated.

SUMMARY

It is an object of the present disclosure to provide an image display apparatus capable of stably sensing a pointer light without a separate optical sensor, and a video wall including the same.

In accordance with an aspect of the present disclosure, the above and other objects can be accomplished by providing an image display apparatus comprising: a panel including a plurality of light emitting diodes; and a driving controller configured to output a scan signal to the plurality of light emitting diodes for each of a plurality of subframe periods, in which the driving controller outputs a scan signal and a data signal to the light emitting diode during the plurality of subframe periods in a first mode corresponding to a display mode, and outputs only any one of the scan signal and the data signal during some subframe periods among the plurality of subframe periods in a second mode for sensing a pointer light.

Meanwhile, the driving controller may be configured to control a forward current to flow on the light emitting diode in the first mode, and control a backward current to flow on the light emitting diode on which the pointer light is incident in the second mode.

Meanwhile, the driving controller may control a pointer image corresponding to the pointer light to be displayed in response to sensing the pointer light in the second mode.

Meanwhile, the driving controller may output only any one of the scan signal and the data signal to the light emitting diode during the plurality of subframe periods in a third mode corresponding to a power saving mode or a stand-by mode.

Meanwhile, in response to sensing the pointer light in the third mode, the driving controller may control a pointer image corresponding to the pointer light to be displayed by switching the third mode to the first mode or the second mode.

Meanwhile, the driving controller may control power supplied to the light emitting diode in the third mode to be less than power supplied to the light emitting diode in the second mode.

Meanwhile, in a state in which a data line is connected to an anode of the light emitting diode and a scan line is connected to a cathode of the light emitting diode, the driving controller may output the scan signal and the data signal to the light emitting diode during the plurality of subframe periods in the first mode, and output only the scan signal to the light emitting diode during some subframe periods among the plurality of subframe periods in the second mode.

Meanwhile, the driving controller may output only the scan signal to the light emitting diode during the plurality of subframe periods in the third mode.

Meanwhile, in a state in which the scan line is connected to an anode of the light emitting diode and the data line is connected to a cathode of the light emitting diode, the driving controller may output the scan signal and the data signal to the light emitting diode during the plurality of subframe periods in the first mode, and output only the data signal to the light emitting diode during some subframe periods among the plurality of subframe periods in the second mode.

Meanwhile, the driving controller may output only the data signal to the light emitting diode during the plurality of subframe periods in the third mode.

Meanwhile, the image display apparatus according to an embodiment of the present disclosure may further include: a plurality of first switching drivers to supply the scan signal or a voltage at a first level to anodes of the plurality of light emitting diodes based on a switching operation during the first mode period; a plurality of second switching drivers to supply a voltage at a second level lower than the first level to cathodes of the plurality of light emitting diodes based on the switching operation during the first mode period; a first switch to output the scan control signal or the voltage at the first level during the first mode period, and not output the scan control signal or the voltage at the first level during the second mode period; and a second switch to output the voltage at the second level during the first mode period, and output a current flowing on at least one of the plurality of light emitting diodes based on the pointer light during the second mode period.

Meanwhile, the image display apparatus according to an embodiment of the present disclosure may further include an amplifier configured to amplify a difference between a first line voltage and a second line voltage based on the current flowing on the light emitting diode during the second mode period.

Meanwhile, an anode voltage of the light emitting diode on which the pointer light is incident may be lower in the second mode period than in the first mode period, or a cathode voltage of the light emitting diode on which the pointer light is incident may be higher in the second mode period than in the first mode period.

Meanwhile, the image display apparatus according to an embodiment of the present disclosure may further include a sensing interface configured to supply a signal output through the amplifier to the driving controller.

Meanwhile, the driving controller may be configured to sequentially drive the plurality of first switching drivers and the plurality of second switching drivers during the second mode period, and the sensing interface may output coordinate information of the pointer light based on sequential driving of the plurality of first switching drivers and the plurality of second switching drivers.

Meanwhile, the sensing interface may output intensity information of the pointer light corresponding to a level of the difference between the first line voltage and the second line voltage.

Meanwhile, the driving controller may control the first mode period to be longer than the second mode period in case in which pointing coordinate information corresponding to the pointer light is not detected during the second mode period.

Meanwhile, the driving controller may control the first mode period to be equal to or shorter than the second mode period in case in which the pointing coordinate information corresponding to the pointer light is detected during the second mode period.

Meanwhile, the image display apparatus according to an embodiment of the present disclosure may further include a signal processing device configured to output an image signal to the display.

Meanwhile, the signal processing device may output an image signal including a pointer image to the display based on the coordinate information of the pointer light from the display apparatus.

Meanwhile, the signal processing device may output an image signal including a pointer image of which size or luminance is varied to the display apparatus based on the intensity information of the pointer light from the display apparatus.

Meanwhile, in accordance with another aspect of the present disclosure, the above and other objects can be accomplished by providing a video wall comprising: a plurality of image display apparatuses, in which the image display apparatus includes a panel including a plurality of light emitting diodes; and a driving controller configured to output a scan signal to the plurality of light emitting diodes for each of a plurality of subframe periods, and the driving controller outputs a scan signal and a data signal to the light emitting diode during the plurality of subframe periods in a first mode corresponding to a display mode, and outputs only any one of the scan signal and the data signal during some subframe periods among the plurality of subframe periods in a second mode for sensing a pointer light.

The image display apparatus according to an embodiment of the present disclosure includes: a panel including a plurality of light emitting diodes; and a driving controller configured to output a scan signal to the plurality of light emitting diodes for each of a plurality of subframe periods, in which the driving controller outputs a scan signal and a data signal to the light emitting diode during the plurality of subframe periods in a first mode corresponding to a display mode, and outputs only any one of the scan signal and the data signal during some subframe periods among the plurality of subframe periods in a second mode for sensing a pointer light. Accordingly, the pointer light can be stably sensed without a separate optical sensor.

Meanwhile, the driving controller may be configured to control a forward current to flow on the light emitting diode in the first mode, and control a backward current to flow on the light emitting diode on which the pointer light is incident in the second mode. Accordingly, the light emitting diode can be emitted based on a first-direction current during a display mode period and the pointer light can be stably sensed without the separate optical sensor based on a second-direction current during a sensing mode period.

Meanwhile, the driving controller may control a pointer image corresponding to the pointer light to be displayed in response to sensing the pointer light in the second mode. Accordingly, the pointer image based on the pointer light can be stably displayed.

Meanwhile, the driving controller may output only any one of the scan signal and the data signal to the light emitting diode during the plurality of subframe periods in a third mode corresponding to a power saving mode or a stand-by mode. Accordingly, the pointer light can be stably sensed in the third mode.

Meanwhile, in response to sensing the pointer light in the third mode, the driving controller may control a pointer image corresponding to the pointer light to be displayed by switching the third mode to the first mode or the second mode. Accordingly, the pointer image based on the pointer light can be stably displayed.

Meanwhile, the driving controller may control power supplied to the light emitting diode in the third mode to be less than power supplied to the light emitting diode in the second mode. Accordingly, the pointer light can be stably sensed in the third mode while reducing power consumption.

Meanwhile, in a state in which a data line is connected to an anode of the light emitting diode and a scan line is connected to a cathode of the light emitting diode, the driving controller may output the scan signal and the data signal to the light emitting diode during the plurality of subframe periods in the first mode, and output only the scan signal to the light emitting diode during some subframe periods among the plurality of subframe periods in the second mode. Accordingly, the pointer light can be stably sensed.

Meanwhile, the driving controller may output only the scan signal to the light emitting diode during the plurality of subframe periods in the third mode. Accordingly, the pointer light can be stably sensed in the third mode.

Meanwhile, in a state in which the scan line is connected to an anode of the light emitting diode and the data line is connected to a cathode of the light emitting diode, the driving controller may output the scan signal and the data signal to the light emitting diode during the plurality of subframe periods in the first mode, and output only the data signal to the light emitting diode during some subframe periods among the plurality of subframe periods in the second mode. Accordingly, the pointer light can be stably sensed.

Meanwhile, the driving controller may output only the data signal to the light emitting diode during the plurality of subframe periods in the third mode. Accordingly, the pointer light can be stably sensed in the third mode.

Meanwhile, the image display apparatus according to an embodiment of the present disclosure may further include: a plurality of first switching drivers to supply the scan signal or a voltage at a first level to anodes of the plurality of light emitting diodes based on a switching operation during the first mode period; a plurality of second switching drivers to supply a voltage at a second level lower than the first level to cathodes of the plurality of light emitting diodes based on the switching operation during the first mode period; a first switch to output the scan control signal or the voltage at the first level during the first mode period, and not output the scan control signal or the voltage at the first level during the second mode period; and a second switch to output the voltage at the second level during the first mode period, and output a current flowing on at least one of the plurality of light emitting diodes based on the pointer light during the second mode period. Accordingly, the pointer light can be stably sensed without a separate optical sensor.

Meanwhile, the image display apparatus according to an embodiment of the present disclosure may further include an amplifier configured to amplify a difference between a first line voltage and a second line voltage based on the current flowing on the light emitting diode during the second mode period. Accordingly, the pointer light can be stably sensed without a separate optical sensor.

Meanwhile, an anode voltage of the light emitting diode on which the pointer light is incident may be lower in the second mode period than in the first mode period, or a cathode voltage of the light emitting diode on which the pointer light is incident may be higher in the second mode period than in the first mode period. Accordingly, the pointer light can be stably sensed without a separate optical sensor during a sensing mode period.

Meanwhile, the image display apparatus according to an embodiment of the present disclosure may further include a sensing interface configured to supply a signal output through the amplifier to the driving controller. Accordingly, coordinate information of the pointer light corresponding to the sensed pointer light can be stably output.

Meanwhile, the driving controller may be configured to sequentially drive the plurality of first switching drivers and the plurality of second switching drivers during the second mode period, and the sensing interface may output coordinate information of the pointer light based on sequential driving of the plurality of first switching drivers and the plurality of second switching drivers. Accordingly, the coordinate information of the pointer light corresponding to the sensed pointer light can be stably output.

Meanwhile, the sensing interface may output intensity information of the pointer light corresponding to a level of the difference between the first line voltage and the second line voltage. Accordingly, intensity information of the pointer light corresponding to the sensed pointer light can be stably output.

Meanwhile, the driving controller may control the first mode period to be longer than the second mode period in case in which pointing coordinate information corresponding to the pointer light is not detected during the second mode period. Accordingly, the sensing mode period can be flexibly controlled.

Meanwhile, the driving controller may control the first mode period to be equal to or shorter than the second mode period in case in which the pointing coordinate information corresponding to the pointer light is detected during the second mode period. Accordingly, the sensing mode period can be flexibly controlled.

Meanwhile, the image display apparatus according to an embodiment of the present disclosure may further include a signal processing device configured to output an image signal to the display. Accordingly, the signal-processed image can be displayed.

Meanwhile, the signal processing device may output an image signal including a pointer image to the display based on the coordinate information of the pointer light from the display apparatus. Accordingly, the pointer image based on the pointer light can be stably displayed.

Meanwhile, the signal processing device may output an image signal including a pointer image of which size or luminance is varied to the display apparatus based on the intensity information of the pointer light from the display apparatus. Accordingly, a pointer image in which a size is varied can be displayed based on the intensity information of the pointer light.

Meanwhile, a video wall according to an embodiment of the present disclosure includes a plurality of image display apparatuses, and the image display apparatus includes a panel including a plurality of light emitting diodes; and a driving controller configured to output a scan signal to the plurality of light emitting diodes for each of a plurality of subframe periods, and the driving controller outputs a scan signal and a data signal to the light emitting diode during the plurality of subframe periods in a first mode corresponding to a display mode, and outputs only any one of the scan signal and the data signal during some subframe periods among the plurality of subframe periods in a second mode for sensing a pointer light. Accordingly, the pointer light can be stably sensed without a separate optical sensor.

BRIEF DESCRIPTION OF THE DRAWINGS

FIG. 6 is a diagram illustrating an example of the light emitting diode panel of FIG. 4;

FIGS. 7A to 7C are diagrams referred to in the description of an operation of an image display apparatus related to the present disclosure.

DETAILED DESCRIPTION OF THE PREFERRED EMBODIMENTS

Hereinafter, the present disclosure will be described in detail with reference to the accompanying drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
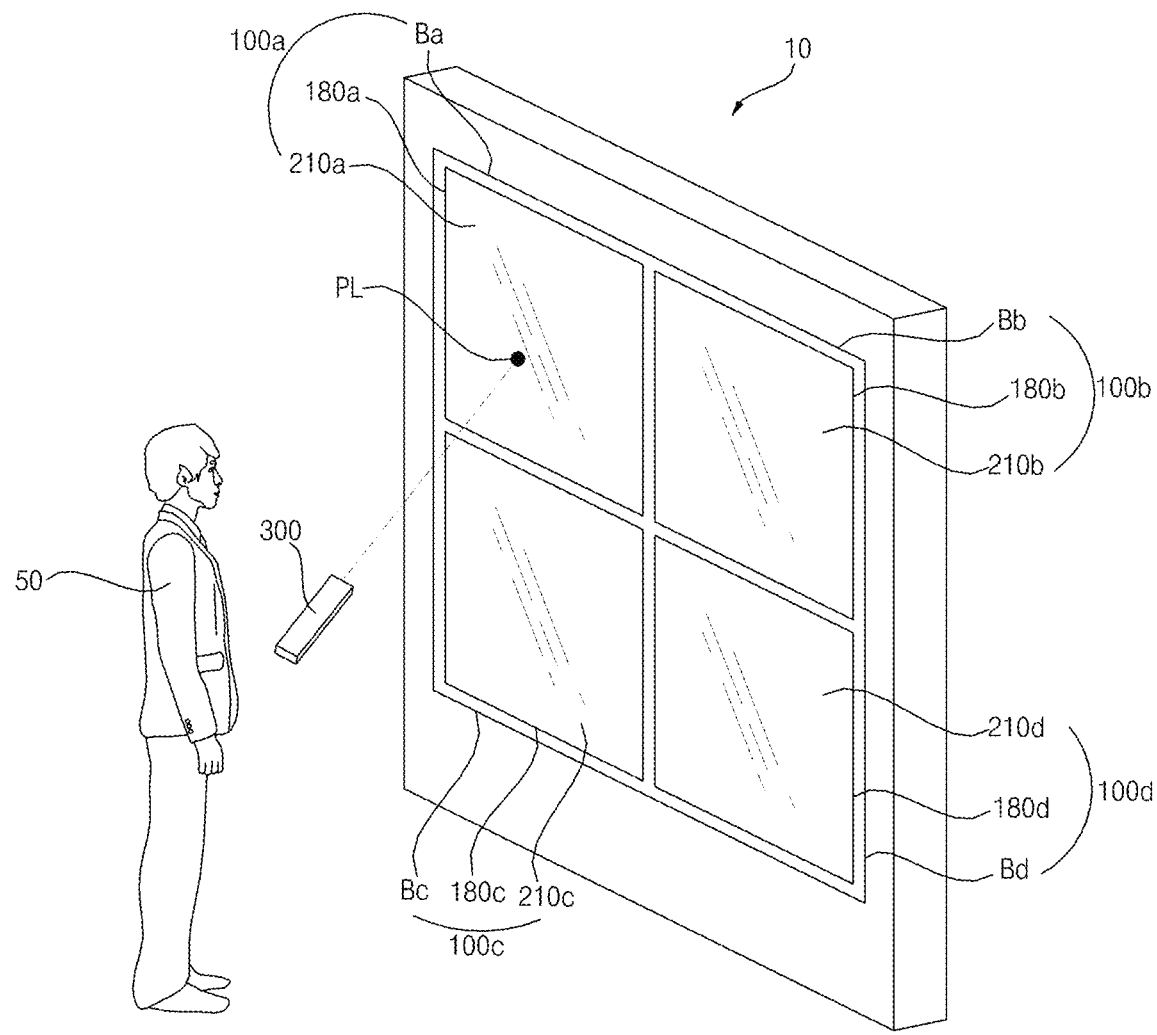
FIG. 1 is a diagram illustrating a video wall according to an embodiment of the present disclosure.

FIG. 1 is a diagram illustrating a video wall according to an embodiment of the present disclosure.

Referring to the drawing, the video wall 10 according to an embodiment of the present disclosure may include a plurality of image display apparatuses 100a to 100d.

The video wall 10 according to an embodiment of the present disclosure may receive images from the set-top box (not shown), the server (not shown), an internal memory, or the like.

For example, the video wall 10 may receive an image signal from the set-top box (not shown) through an HDMI terminal.

In another example, the video wall 10 may receive an image signal from the server (not shown) through a network terminal.

Meanwhile, the video wall 10 may be installed inside or outside a building.

For example, the video wall 10 may be provided in public places such as vehicles, bus terminals, railroad stations and airports, in order to provide information such as advertisements, news and notices. In addition, the display apparatus may be provided near display windows of department stores, shopping malls or markets, for advertisements of specific products.

In another example, the video wall 10 may be installed on a wall surface in a house.

The video wall 10 may comprise a plurality of displays 180a to 180d arranged contiguously.

Meanwhile, a plurality of displays 180a to 180d may be implemented with any one of various panels. For example, the plurality of displays 180a to 180d may be any one of a liquid crystal display (LCD) panel, a light emitting diode (OLED) panel, an inorganic light emitting diode (LED) panel, and the like.

The following description will be made based on an example in which the plurality of displays 180a to 180d comprise the inorganic light emitting diode (LED) panel.

Meanwhile, the inorganic light emitting diode (LED) panel includes light emitting diodes, and is advantageous in that it has a fast response speed and can reproduce colors very well.

Meanwhile, the plurality of displays 180a to 180d may comprise a plurality of panels 210a to 210d and bezels Ba to Bd surrounding the panels 210a to 210d, respectively.

In the figure, the video wall 10 includes a plurality of image display apparatuses 100a to 100d including respective displays 180a to 180d.

Alternatively, for image display of the video wall 10, signal processing devices 170 to 170d provided respectively in the plurality of image display apparatuses 100a to 100d may be used.

For example, images distributed by the signal processing device 170 may be inputted into the signal processing devices 170 to 170d provided respectively in the plurality of image display devices 100a to 100d, and images whose image signals are processed by the respective signal processing devices 170 to 170d may be inputted into the respective displays 180a to 180d, and the respective displays 180a to 180d may display the images.

Accordingly, a viewer 50 can view the images displayed through the video wall 10 as shown in the figure. In particular, the viewer can view the images displayed through the plurality of displays 180a to 180d.

In another example, the video wall 10 may comprise one signal processing device for commonly controlling the plurality of image display apparatuses 100a to 100d. The common signal processing device may perform signal processing on the displayed image. The processed images may be input to the displays 180a to 180d and the respective displays 180a to 180d may display the images.

Meanwhile, at least one of the plurality of display apparatuses 100a to 100d may operate based on a pointing signal from a remote controller 200 or a pointing light from a pointing device 300.

Meanwhile, the present disclosure presents a method for stably sensing a pointer light PL by using a light emitting diode which is a self-light emitting element without a separate optical sensor. This will be described in more detail w with reference to FIG. 8 or below.

Figure 2:
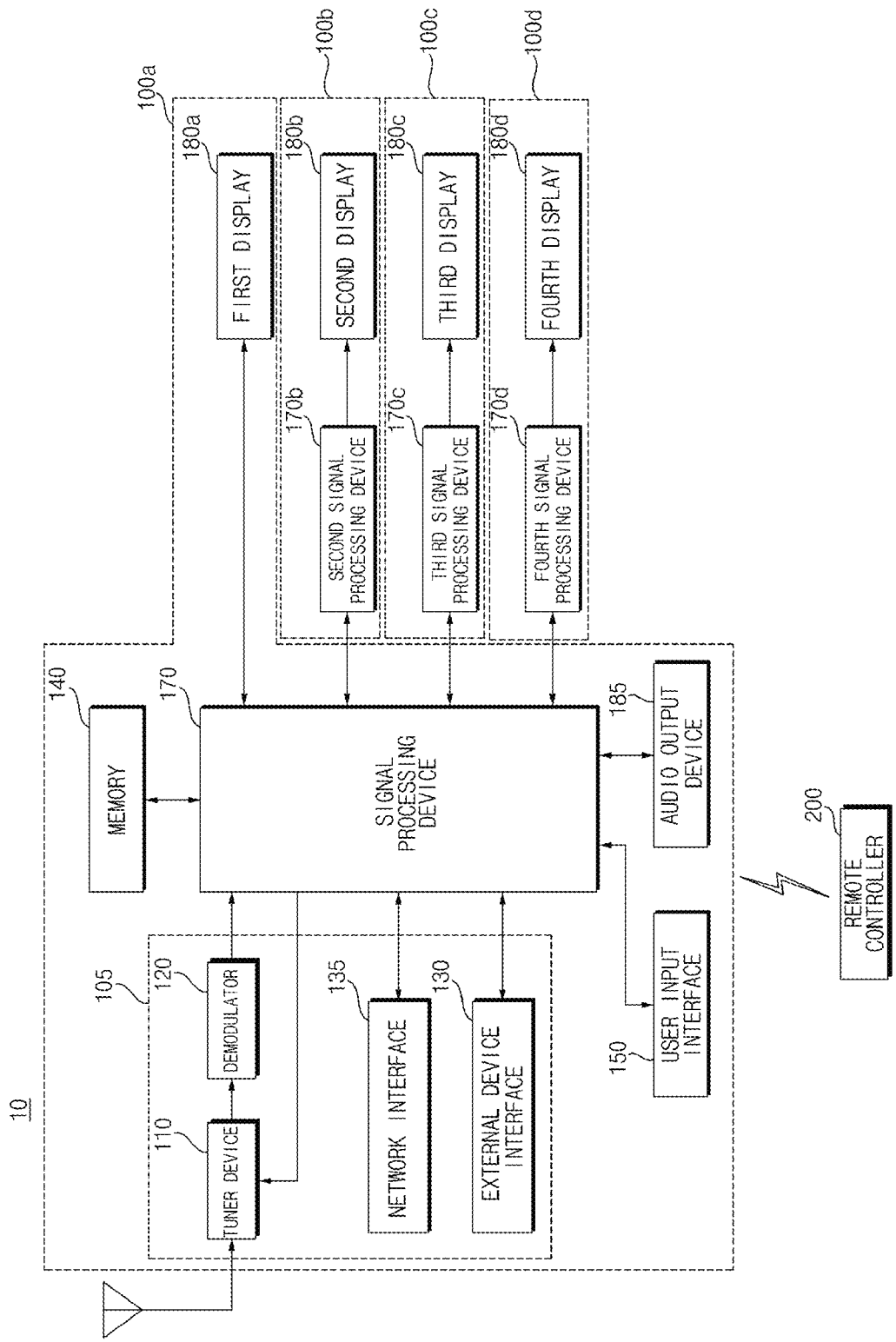
FIG. 2 is an example of an internal block diagram of a video wall of FIG. 1.

FIG. 2 is an example of an internal block diagram of a video wall of FIG. 1.

Referring to the drawing, the video wall 10 may comprise a first to fourth image display apparatuses 100a to 100d.

In the drawing, an example is illustrated in which the second to fourth image display apparatuses 100b to 100d have second to fourth displays 180b to 180d, respectively, or a second to fourth signal processing devices 170b to 170d, respectively, but may comprise an external device interface, a network interface, a memory, an image divider, a power supply, an audio output device 185, etc., unlike the drawing.

Meanwhile, the first image display apparatus 100a may comprise an external device interface 130, a network interface 135, a memory 140, a user input interface 150, a signal processing device 170, a first display device 180a, a power supply 190, an audio output device 185, and the like.

The external device interface 130 may serve to transmit or receive data to or from an external device (not shown) connected thereto. The external device interface 130 may comprise an A/V input/output (I/O) device (not shown) or a data input/output module (not shown).

For example, the external device interface 130 may comprise an HDMI port, an RGB port, a component port, a USB port, a micro SD port, etc.

The network interface 135 serves as an interface between the image video wall 100 and a wired/wireless network such as the Internet. For example, the network interface 135 may receive content or data provided by an Internet or content provider or a network operator over a network.

The memory 140 may store various programs necessary for the signal processing device 170 to process and control signals, and may also store processed video, audio and data signals.

Further, the memory 140 may temporarily store a video, audio and/or data signal received from the external device interface 130.

Meanwhile, the plurality of displays 180a to 180d may be contiguously arranged, may comprise various display panels such as LCDs, OLEDs, PDPs, etc., and may display predetermined images through the display panels.

The user input interface 150 transmits a signal input by the user to the signal processing device 170 or transmits a signal received from the signal processing device 170 to the user.

To this end, the user input interface 150 may comprise a local key comprising a power key, a touch panel for inputting user information, etc.

The signal processing device 170 may divide an input image stored in the memory 140 or an input image received from an external device through the external device interface 130 or the network interface 135 into a plurality of images, for displaying the input image through the plurality of displays 180a to 180d.

For example, the signal processing device 170 may crop the input image into a plurality of images and scale the images.

In particular, the signal processing device 170 may perform cropping and scaling in consideration of the resolution and size of the plurality of displays 180*a* to 180*d*.

Meanwhile, the signal processing device 170 may perform overall control of the video wall 10, and, more particularly, control operation of the units of the video wall 10.

Meanwhile, the signal processing device 170 may distribute images and send the distributed images to the plurality of signal processing devices 170 to 170*d*.

Meanwhile, at least one signal processing device may be provided in order to control the plurality of displays 180*a* to 180*d*.

Meanwhile, in the figure, the plurality of signal processing devices 170 to 170*d* corresponding to the plurality of displays 180*a* to 180*d* is shown, in order to control the plurality of displays 180*a* to 180*d*.

The plurality of signal processing devices 170 to 170*d* may perform control operation for image display through the plurality of displays 180*a* to 180*d*.

The plurality of signal processing devices 170 to 170*d* may process an input image signal and send the processed image signal to the plurality of displays 180*a* to 180*d*, respectively.

That is, each of the plurality of signal processing devices 170 to 170*d* may control the plurality of displays 180*a* to 180*d* to output a predetermined image. More specifically, RGB signals corresponding to a video image to be displayed may be output through the plurality of displays 180*a* to 180*d*. Thus, the plurality of displays 180*a* to 180*d* may display respective images.

The power supply 190 may receive external or internal power and supply power necessary for operation of the components.

The power supply 190 supplies power to the image video wall 100 and, more particularly, the plurality of signal processing devices 170 to 170*d* implemented in the form of a system on chip (SOC), the plurality of displays 180*a* to 180*d* for displaying video, and the audio output device 185 for outputting audio.

A temperature sensor (not shown) may sense the temperature of the video wall 10.

The temperature sensed by the temperature sensor (not shown) may be inputted to at least one of the plurality of signal processing devices 170 to 170*d*, and at least one of the plurality of signal processing devices 170 to 170*d* may control operation of a fan driver (not shown) in order to reduce internal heat based on the sensed temperature.

Meanwhile, the image display apparatus 100*a* according to an embodiment of the present disclosure may include an image receiver 105, a memory 140, a user input interface 150, a sensor part (not shown), a signal processing device 170, a display device 180, and an audio output device 185.

The image receiver 105 may comprise a tuner 110, a demodulator 120, a network interface 135, and an external device interface 130.

Meanwhile, unlike the drawing, the image receiver 105 may comprise only the tuner 110, the demodulator 120, and the external device interface 130. That is, the network interface 135 may not be comprised.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processing device 170.

Meanwhile, the tuner 110 can comprise a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a demultiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display device 180 and outputs audio to the audio output device 185.

The external device interface 130 may transmit or receive data with a connected external apparatus (not shown), e.g., a set-top box 50. To this end, the external device interface 130 may comprise an A/V input and output device (not shown).

The external device interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless communication device (not shown) may perform short-range wireless communication with other electronic apparatus.

Through the wireless communication device (not shown), the external device interface 130 may exchange data with an adjacent mobile terminal (not shown). In particular, in a mirroring mode, the external device interface 130 may receive device information, executed application information, application image, and the like from the mobile terminal (not shown).

The network interface 135 provides an interface for connecting the image display apparatus 100 to a wired/wireless network comprising the Internet network. For example, the network interface 135 may receive, via the network, content or data provided by the Internet, a content provider, or a network operator.

Meanwhile, the network interface 135 may comprise a wireless communication device (not shown).

The memory 140 may store a program for each signal processing and control in the signal processing device 170, and may store a signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory 140 is provided separately from the signal processing device 170, the scope of the present disclosure is not limited thereto. The memory 140 may be comprised in the signal processing device 170.

The user input interface 150 transmits a signal input by the user to the signal processing device 170 or transmits a signal from the signal processing device 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external device interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a signal-processed image signal.

The image signal processed by the signal processing device 170 is input to the display device 180, and may be displayed as an image corresponding to the image signal. In addition, the image signal processed by the signal processing device 170 may be input to the external output apparatus through the external device interface 130.

The audio signal processed by the signal processing device 170 may be output to the audio output device 185 as an audio signal. In addition, audio signal processed by the signal processing device 170 may be input to the external output apparatus through the external device interface 130.

Although not shown in FIG. 2, the signal processing device 170 may comprise a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 can control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display device 180 to display an image. At this time, the image displayed on the display device 180 may be a still image or a moving image, and may be a 2D image or a 3D image.

Meanwhile, the signal processing device 170 may display a certain object in an image displayed on the display device 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display device 180 corresponding to a user position can be determined.

The display device 180 generates a driving signal by converting an image signal, a data signal, an OSD signal, a control signal processed by the signal processing device 170, an image signal, a data signal, a control signal, and the like received from the external device interface 130.

Meanwhile, the display device 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which can be implemented in the form of a system on chip (SOC), a display device 180 for displaying an image, and an audio output device 185 for outputting an audio.

Specifically, the power supply 190 may comprise a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
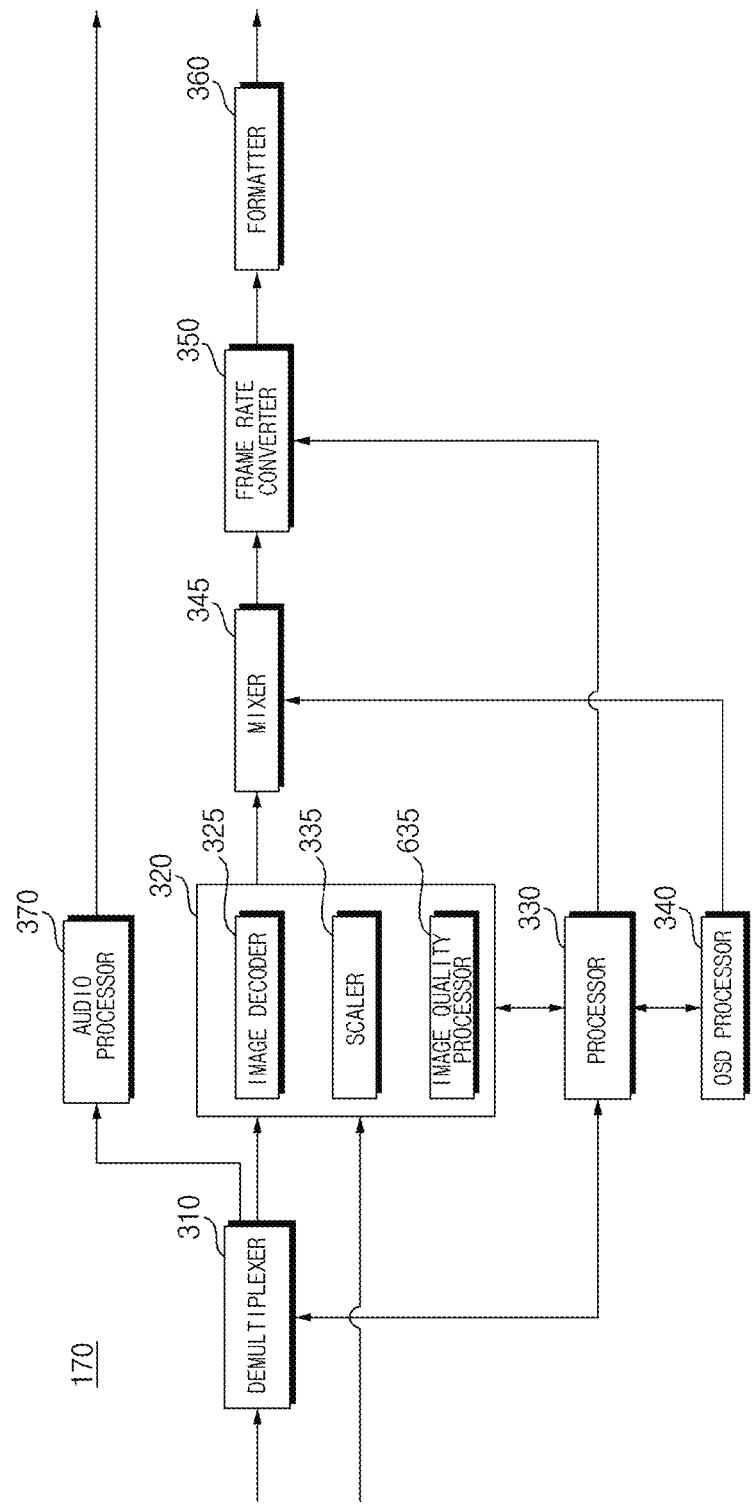
FIG. 3 is an example of an internal block diagram of an image display apparatus of FIG. 1.

FIG. 3 is an example of an internal block diagram of a signal processing device of FIG. 2.

Referring to the drawing, the signal processing device 170 according to an embodiment of the present disclosure may comprise a demultiplexer 310, an image processor 320, a processor 330, and an audio processor 370. In addition, the signal processing device 170 may further comprise and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external device interface 130.

The image processor 320 may perform signal processing on an input image. For example, the image processor 320 may perform image processing on an image signal demultiplexed by the demultiplexer 310.

To this end, the image processor 320 may comprise an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display device 180.

The image decoder 325 can comprise a decoder of various standards. For example, a 3D image decoder for MPEG-2, H.264 decoder, a color image, and a depth image, and a decoder for a plurality of view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of high gray level of the input image signal, perform image resolution enhancement, perform high dynamic range (HDR)-based signal processing, change a video frame rate, or perform image quality processing appropriate for properties of a panel, especially a light emitting diode panel, etc.

The OSD processor 340 generates an OSD signal according to a user input or by itself. For example, based on a user input signal, the OSD processor 340 may generate a signal for displaying various information as a graphic or a text on the screen of the display device 180. The generated OSD signal may comprise various data such as a user interface screen of the image display apparatus 100, various menu screens, a widget, and an icon. In addition, the generated OSD signal may comprise a 2D object or a 3D object.

In addition, the OSD processor 340 may generate a pointer that can be displayed on the display, based on a pointing signal input from the remote controller 200. In particular, such a pointer may be generated by a pointing controller, and the OSD processor 240 may comprise the pointing controller (not shown). Obviously, the pointing controller (not shown) may be provided separately from the OSD processor 240.

The Frame Rate Converter (FRC) 350 may convert a frame rate of the input image. The frame rate converter 350 may output the image as it is without separate frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external device interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may comprise various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it can be decoded. The encoded data signal may be electronic program guide information comprising broadcast information such as a start time and an end time of a broadcast program broadcasted on each channel.

Figure 4:
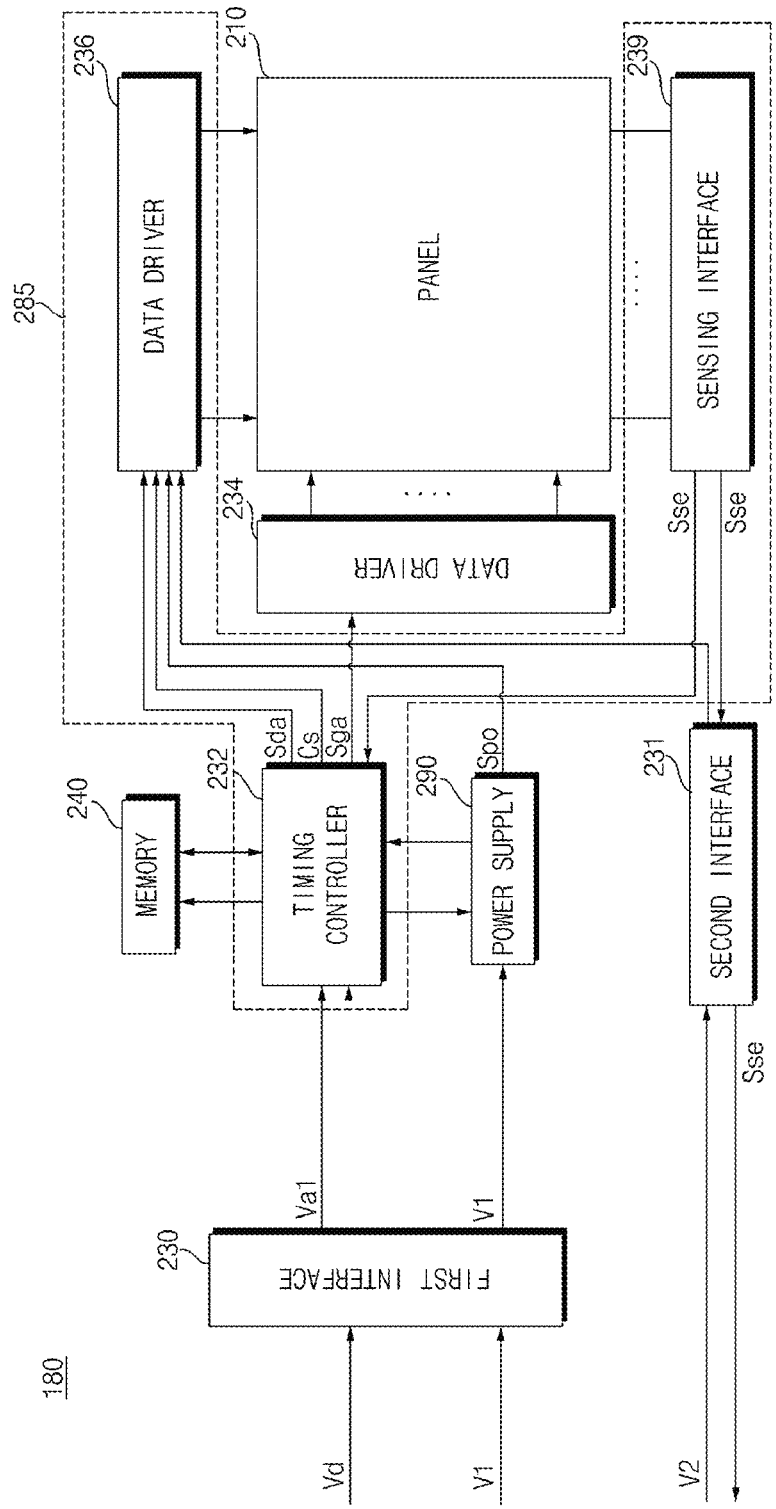
FIG. 4 is an internal block diagram of a display of FIG. 2.

Meanwhile, a block diagram of the signal processing device 170 shown in FIG. 4 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

FIG. 4 is an internal block diagram of a display of FIG. 2.

Referring to the drawing, the light emitting diode panel-based display device 180 may include a light emitting diode panel 210, a first interface 230, a second interface 231, a timing controller 232, a gate driver 234, a data driver 236, a memory 240, a power supply 290, and the like.

The display device 180 receives an image signal Vd, a first DC power V1, and a second DC power V2, and may display a certain image based on the image signal Vd.

Meanwhile, the first interface 230 in the display device 180 may receive the image signal Vd and the first DC power V1 from the signal processing device 170.

Here, the first DC power V1 may be used for the operation of the power supply 290 and the timing controller 232 in the display device 180.

Next, the second interface 231 may receive a second DC power V2 from an external power supply 190. Meanwhile, the second DC power V2 may be input to the data driver 236 in the display device 180.

The timing controller 232 may output a data driving signal Sda and a gate driving signal Sga, based on the image signal Vd.

For example, when the first interface 230 converts the input image signal Vd and outputs the converted image signal val, the timing controller 232 may output the data driving signal Sda and the gate driving signal Sga based on the converted image signal val.

The timing controller 232 may further receive a control signal, a vertical synchronization signal Vsync, and the like, in addition to the image signal Vd from the signal processing device 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 comprises a RGB subpixel, the data driving signal Sda may be a data driving signal for driving of RGB subpixel.

Meanwhile, the timing controller 232 may further output a control signal Cs to the gate driver 234.

The gate driver 234 and the data driver 236 supply a scan signal and a data signal to the light emitting diode panel 210 through a gate line GL and a data line DL respectively, according to the gate driving signal Sga and the data driving signal Sda from the timing controller 232. Accordingly, the light emitting diode panel 210 displays a certain image.

Meanwhile, the light emitting diode panel 210 may include a light emitting layer. In order to display an image, a plurality of gate lines GL and data lines DL may be disposed in a matrix form in each pixel corresponding to the light emitting layer.

Meanwhile, the gate line GL may be called a scan line since a scan signal is inputted through it.

Meanwhile, the data driver 236 may output a data signal to the light emitting diode panel 210 based on a second DC power V2 from the second interface 231.

The power supply 290 may supply various power supplies to the gate driver 234, the data driver 236, the timing controller 232, and the like.

Meanwhile, in the drawing, the timing controller 232, the gate driver 234, and the data driver 236 may be implemented as a single integrated circuit IC.

Accordingly, the timing controller 232, the gate driver 234, and the data driver 236 may be called a driving controller 285.

Figure 5A:
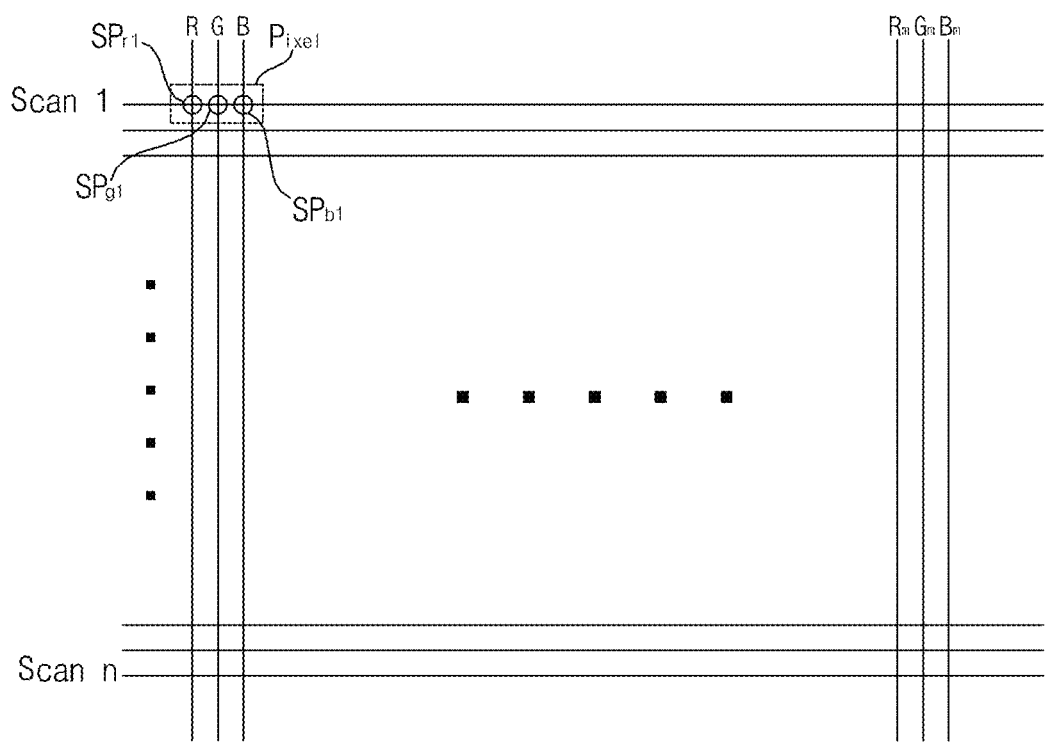
FIGS. 5A to 5C are diagrams referred to in the description of a light emitting diode panel of FIG. 4.
Figure 5B:
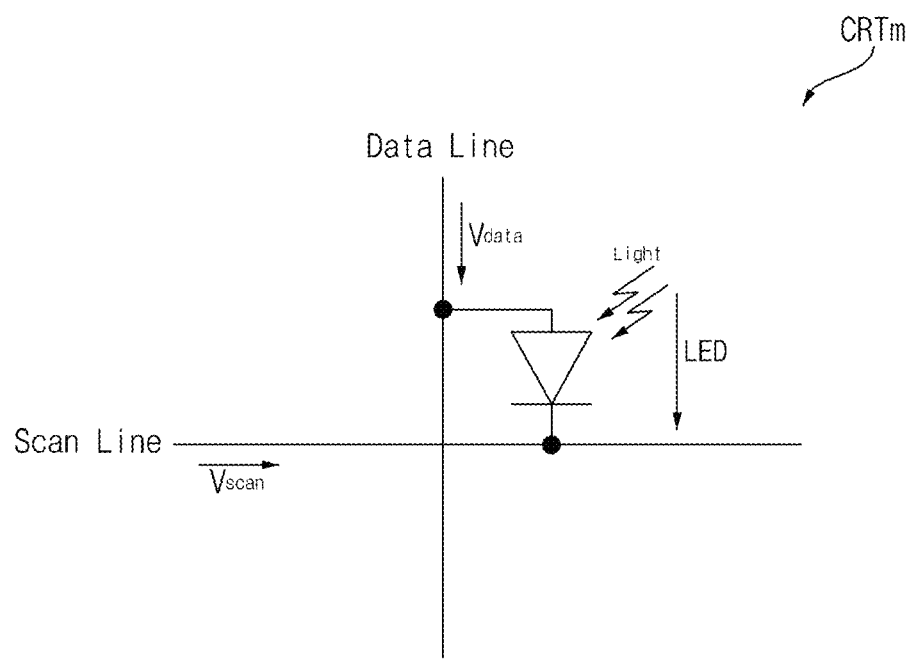

FIG. 5A and FIG. 5B are diagrams referred to in the description of a light emitting diode panel of FIG. 4.

Firstly, FIG. 5A is a diagram illustrating a pixel in the light emitting diode panel 210.

Referring to drawing, the light emitting diode panel 210 may include a plurality of scan lines Scan 1 to Scan n and a plurality of data lines R1, G1, and B1 to Rm, Gm, and Bm intersecting the scan lines.

Meanwhile, a pixel (subpixel) is defined in an intersecting area of the scan line and the data line in the light emitting diode panel 210. In the drawing, a pixel comprising subpixels SR1, SG1, and SB1 of RGB is shown.

Meanwhile, a red light emitting diode, a green light emitting diode, and a blue light emitting diode are disposed in the subpixels SR1, SG1, and SB1 of RGB.

FIG. 5B illustrates a circuit of any one sub-pixel in the pixel of the light emitting diode panel of FIG. 5A.

Referring to the drawing, a light emitting sub pixel circuit (CRTm) may be passive type, and may include a light emitting diode LED alone without a switching element.

As shown in the drawing, an anode of the light emitting diode LED may be connected to a data line through which a data signal Vdata is inputted, and a cathode of the light emitting diode LED may be connected to a scan line through which a scan signal Vscan is inputted.

Meanwhile, the light emitting diode may emit light or not, based on a plurality of subframes based on the passive matrix scheme.

Figure 5C:
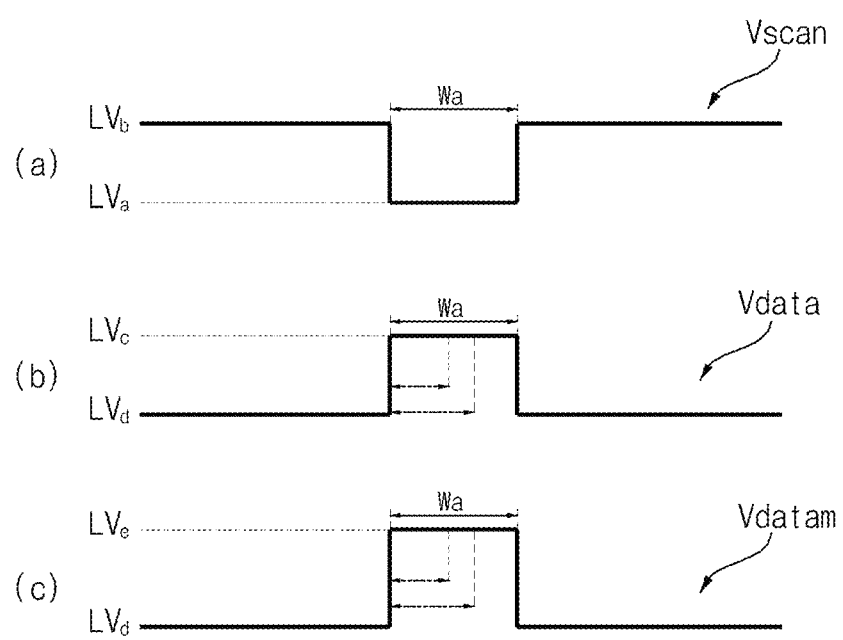

FIG. 5C is a diagram showing an example of a scan signal and data signals.

Referring to the drawing, a scan signal Vscan applied to a red light emitting diode, a green light emitting diode, and a blue light emitting diode maintains LVb level and then drops to LVa level at a scan timing.

In this case, the width of the scan signal Vscan may be set to Wa.

Meanwhile, the red light emitting diode may have higher luminance efficiency than the green light emitting diode and the blue light emitting diode because of the device characteristics.

In response to this, the driving controller 285 may be configured to control the level of a data signal supplied to the red light emitting diode to be lower than the level of a data signal supplied to the green light emitting diode or the blue light emitting diode.

(b) of FIG. 5C illustrates a data signal Vdata which maintains LVd level and rises to LVc level in response to a scan timing of the scan signal Vscan.

(c) of FIG. 5C illustrates a data signal Vdatam which maintains LVd level and rises to LVe level which is higher than LVc level in response to a scan timing of the scan signal Vscan.

The data signal Vdata of LVc level may be applied to the red light emitting diode, and the data signal Vdatam of LVe level which is higher than LVc level may be applied to the green light emitting diode or the blue light emitting diode.

Accordingly, a data signal corresponding to a light emitting diode can be outputted, and furthermore uniform colors can be rendered.

Meanwhile, the data signal Vdatda in (b) of FIG. 5C or the data signal Vdatam in (c) of FIG. 5C are data signal based on pulse width modulations, and the luminance of the light emitting diodes varies with variations in duty corresponding to pulse width.

Figure 6:
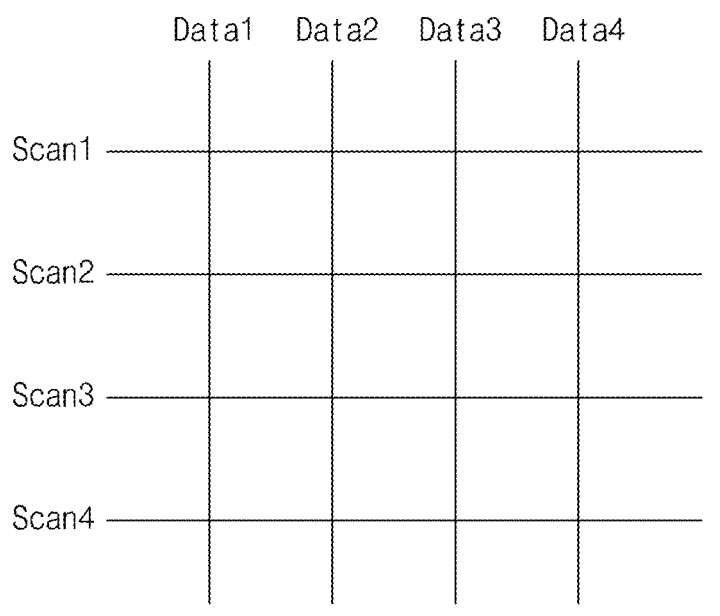

FIG. 6 is a diagram illustrating an example of the light emitting diode panel of FIG. 4.

Referring to the drawing, the light emitting diode panel 210 may include a plurality of data lines and a plurality of scan lines.

In FIG. 6, as an example of the light emitting diode panel 210, four data lines Data1 to Data4 and four scan lines Scan1 to Scan4 are illustrated for convenience of explanation.

Figure 7B:
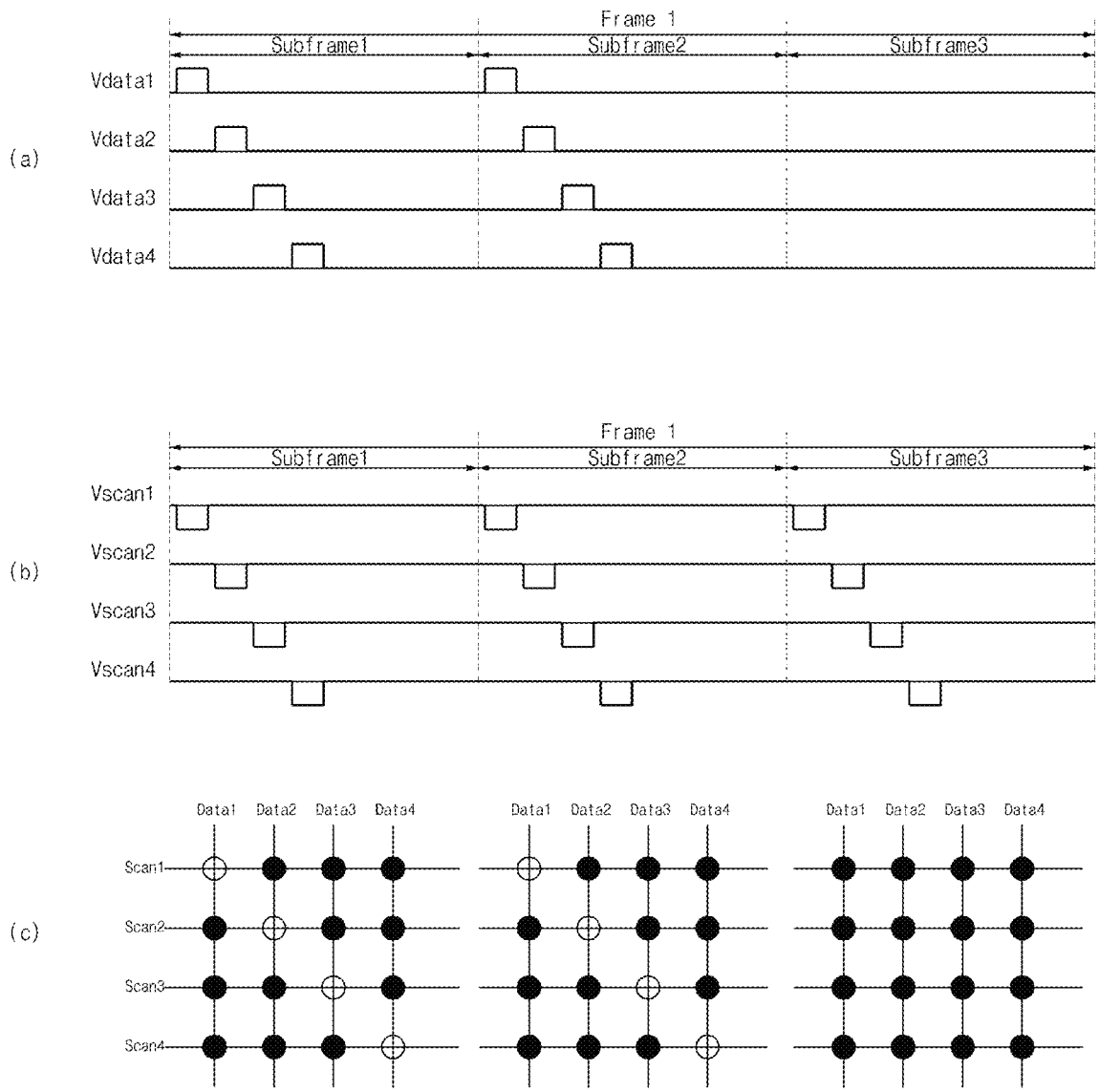
Figure 7C:
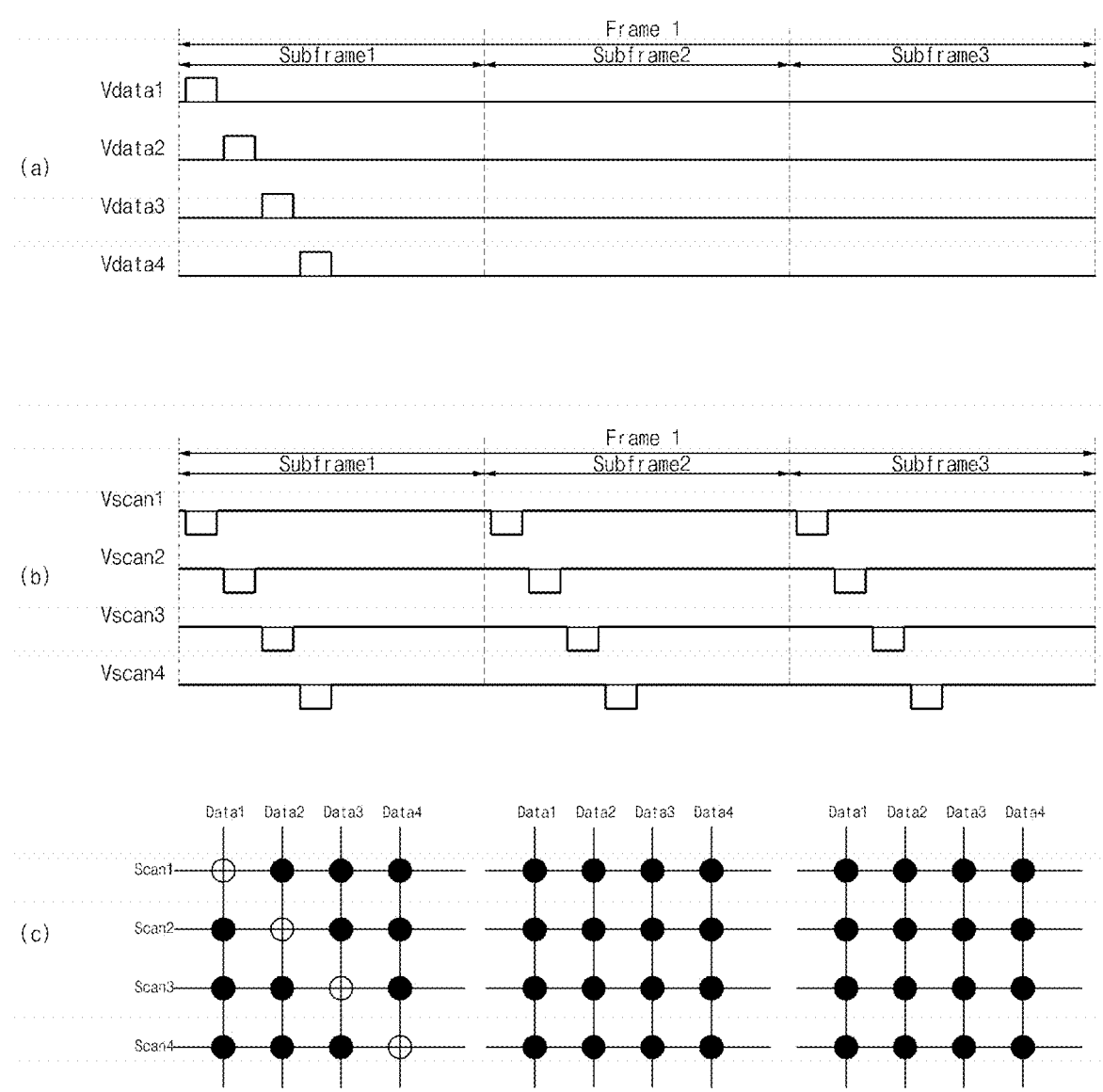

FIGS. 7A to 7C are diagrams referred to in the description of an operation of an image display apparatus related to the present disclosure.

FIG. 7A illustrates an example of a data signal applied when a frame has a first gray level, during a plurality of subframe periods within a frame period.

Referring to the drawings, a plurality of subframe periods Subframes 1 to 3 may be included within a frame period Frame 1.

Although the drawing illustrates a plurality of subframe periods Subframes 1 to 3 within a frame period Frame 1 for convenience of explanation, many variations may be made.

(a) of FIG. 7A illustrates that data signals Vdata 1 to 4 are respectively applied to the four data lines shown in FIG. 6 during the first subframe period Subframe 1 which is one of the plurality of subframe periods Subframes 1 to 3.

In the drawing, data signals Vdata 1 to 4 each having four pulses or voltages Vx are respectively applied to four data lines during the first subframe period Subframe 1.

In this case, the pulse width of the data signals Vdata 1 to 4 may be Wx.

(b) of FIG. 7A illustrates that scan signals Vscan 1 to 4 are sequentially applied to four scan data lines during the first subframe period Subframe 1.

Accordingly, as shown in (c) of FIG. 7A, sixteen light emitting diodes emit light during the first subframe period Subframe 1.

(a) of FIG. 7A illustrates that data signals Vdata 1 to 4 are respectively applied to the four data lines shown in FIG. 6 during the second subframe period Subframe 2.

In the drawing, data signals Vdata 1 to 4 each having one pulse or voltage Vx are respectively applied to four data lines during the second subframe period Subframe 2.

(b) of FIG. 7A illustrates that scan signals Vscan 1 to 4 are sequentially applied to four scan lines during the second subframe period Subframe 2.

Accordingly, as shown in (c) of FIG. 7A, four light emitting diodes in a diagonal orientation emit light during the second subframe period Subframe 2.

(a) of FIG. 7A illustrates that data signals Vdata 1 to 4 are respectively applied to the four data lines shown in FIG. 6 during the third subframe period Subframe 3.

In the drawing, data signals Vdata 1 to 4 each having one pulse or voltage Vx are respectively applied to four data lines during the third subframe period Subframe 3.

(b) of FIG. 7A illustrates that scan signals Vscan 1 to 4 are sequentially applied to four scan lines during the third subframe period Subframe 3.

Accordingly, as shown in (c) of FIG. 7A, four light emitting diodes in a diagonal orientation emit light during the third subframe period Subframe 3.

FIG. 7B illustrates an example of a data signal applied when a frame has a second gray level which is lower than the first gray level, during a plurality of subframe periods within a frame period.

(a) FIG. 7B illustrates that data signals Vdata 1 to 4 are applied to four data lines illustrated in FIG. 6, respectively during a first subframe period Subframe 1 among the plurality of subframe periods Subframes 1 to 3.

In the drawing, data signals Vdata 1 to 4 are illustrated, which have four pulses or voltages Vx in four data lines, respectively during the Subframe 1 period.

In this case, pulse widths of the data signals Vdata 1 to 4 may be Wx.

(b) of FIG. 7B illustrates that scan signals Vscan 1 to 4 are sequentially applied to four scan lines during the plurality of subframe periods Subframes 1 to 3.

Accordingly, during the first subframe period Subframe 1, 16 light emitting diodes are emitted as illustrated in (c) of FIG. 7B.

Meanwhile, (a) of FIG. 7B illustrates that data signals Vdata 1 to 4 having one pulse or voltage Vx are applied to four data lines illustrated in FIG. 6, respectively during a second subframe period Subframe 2 among the plurality of subframe periods Subframes 1 to 3, and the pulse or voltage Vx is not applied during a third subframe period Subframe 3.

Accordingly, during the second subframe period Subframe 2, 4 light emitting diodes in a diagonal direction are emitted as illustrated in (c) of FIG. 7B, and during the third subframe period Subframe 3, 16 light emitting diodes are all turned off, and not emitted.

FIG. 7C illustrates an example of a data signal applied in response to a case where a frame gray level is a third gray level lower than a second gray level during a plurality of subframe periods within a frame period.

(a) of FIG. 7C illustrates that data signals Vdata 1 to 4 having one pulse or voltage Vx are applied to four data lines illustrated in FIG. 6, respectively during a first subframe period Subframe 1 among the plurality of subframe periods Subframes 1 to 3, and the pulse or voltage Vx is not applied during the second subframe period Subframe 2 and the third subframe period Subframe 3.

(a) of FIG. 7C illustrates that scan signals Vscan 1 to 4 are sequentially applied to 4 scan lines, respectively during the plurality of subframe periods Subframes 1 to 3.

Accordingly, during the first subframe period Subframe 1, 4 light emitting diodes in the diagonal direction are emitted as illustrated in (c) of FIG. 7C, and during the second subframe period Subframe 2 and the third subframe period Subframe 3, 16 light emitting diodes are all turned off, and not emitted.

Meanwhile, FIG. 7A may correspond to a first mode which is a display mode of the present disclosure, and FIG. 7B or 7C may correspond to a second mode for sensing the pointer light PL.

Figure 8:
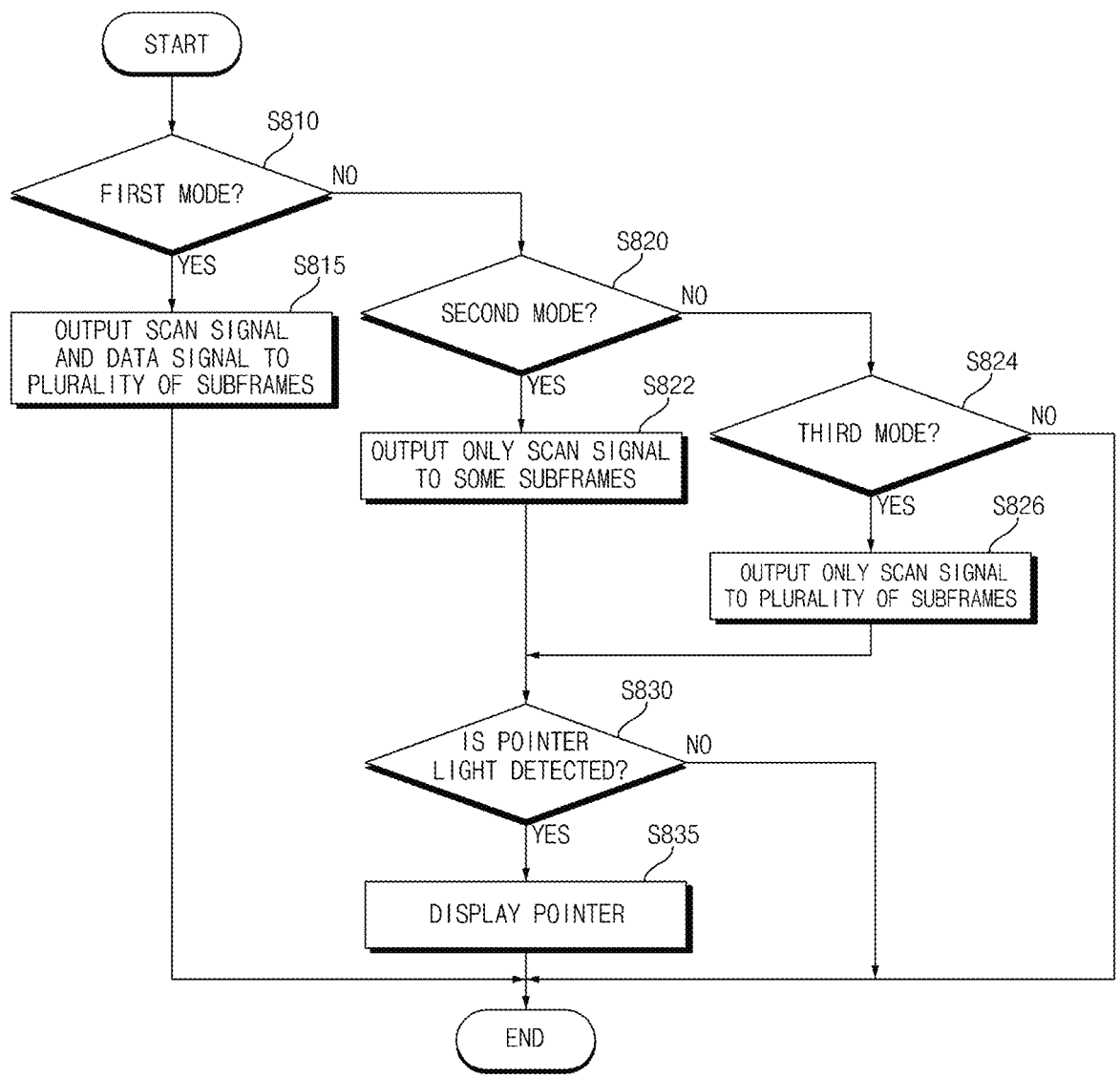
FIG. 8 is a flowchart illustrating an operation method of an image display apparatus according to an embodiment of the present disclosure.

FIG. 8 is a flowchart illustrating an operation method of an image display apparatus according to an embodiment of the present disclosure.

Referring to the drawing, the driving controller 285 in the image display apparatus 100 according to an embodiment of the present disclosure determines whether a plurality of subframe output modes is the first mode which is the display mode (S810), and outputs the scan signal and the data signal to the light emitting diode during a plurality of subframe periods when the plurality of subframe output modes corresponds to the first mode (S815).

Meanwhile, the driving controller 285 may be configured to control a forward current to flow on the light emitting diode in the first mode.

For example, the driving controller 285 may output each of the scan signal and the data signal during the plurality of subframe periods Subframes 1 to 3 as in FIG. 7A in the first mode which is the display mode. Accordingly, according to the display mode, the forward current flows on a plurality of light emitting diodes, so the plurality of light emitting diodes is emitted.

Meanwhile, the driving controller 285 according to an embodiment of the present disclosure determines whether the plurality of subframe output modes is a second mode for sensing the pointer light PL when the plurality of subframe output modes is not the first mode which is the display mode in step S810 (S820), and outputs only any one of the scan signal and the data signal to the light emitting diode during some subframe periods among the plurality of subframe periods when the plurality of subframe output modes is the second mode (S822).

Meanwhile, the driving controller 285 may be configured to control a backward current to flow on the light emitting diode in the second mode.

For example, the driving controller 285 outputs each of the scan signal and the data signal during first and second subframe periods Subframes 1 and 2 among the plurality of subframe periods Subframes 1 to 3, and outputs only the scan signal to the light emitting diode during the third subframe period Subframe 3 which is some of the plurality of subframe periods, as in FIG. 7B in the second mode for sensing the pointer light PL.

Accordingly, during the first and second subframe periods Subframes 1 and 2, the forward current flows on the light emitting diode and the light emitting diode is emitted, and during the third subframe period Subframe 3, when the pointer light PL is sensed, the backward current flows on the light emitting diode. Accordingly, the pointer light PL can be stably sensed without a separate optical sensor.

Meanwhile, when the second mode for sensing the pointer light PL is performed, and then switched to the first mode, the driving controller 285 may control the scan signal and the data signal not to be output, but an idle period to be maintained during some subframe periods of outputting only the scan signal in the second mode.

That is, the driving controller 285 may control some subframe periods to operate as an empty subframe period according to mode switching.

For example, in the second mode, only the scan signal is output during the third subframe period Subframe 3, and when the second mode is switched to the first mode, the driving controller 285 may control the scan signal and the data signal not to be output, but the idle period to be maintained during the third subframe period Subframe 3.

Meanwhile, the driving controller 285 may be configured to control the forward current to flow on the light emitting diode in the first mode, and control the backward current to flow on the light emitting diode on which the pointer light PL is incident in the second mode. Accordingly, the light emitting diode can be emitted based on a first-direction current during the display mode period and the pointer light PL can be stably sensed without the separate optical sensor based on a second-direction current which is the reverse direction during a sensing mode period.

Meanwhile, the driving controller 285 may determine whether the pointer light PL is detected in the second mode (S830), and control a pointer image corresponding to the pointer light PL to be displayed when the pointer light PL is detected (S835).

For example, when the pointer light PL is detected in the second mode, the driving controller 285 may transmit coordinate information of the pointer light PL based on the backward current of the light emitting diode to the signal processing device 170.

In addition, the signal processing device 170 may transmit the pointer image based on the coordinate information of the pointer light PL to the driving controller 285.

Accordingly, the driving controller 285 may display the pointer image corresponding to the pointer light PL on the display 180.

Meanwhile, when the pointer light PL is detected in the second mode, the driving controller 285 may transmit coordinate information of the pointer light PL based on the backward current of the light emitting diode to the signal processing device 170.

Specifically, when the pointer light PL is detected for less than a predetermined time in the second mode, the driving controller 285 may not transmit the coordinate information of the pointer light PL to the signal processing device 170, and may transmit the coordinate information of the pointer light PL to the signal processing device 170 only when the pointer light PL is detected for a predetermined time or more.

Meanwhile, only when the pointer light PL is detected throughout a plurality of subframe periods in the second mode, the driving controller 285 may transmit the coordinate information of the pointer light PL to the signal processing device 170.

For example, the driving controller 285 may output the scan signal and the data signal during 55 subframe periods among 60 subframes, and output only the scan signal during 5 subframe periods according to the second mode.

In this case, it is also possible that 5 subframe periods are consecutively arranged and it is also possible that 5 subframe periods are arranged to be spaced apart from each other.

In addition, only when the pointer light PL is detected during 3 subframe periods or more among 60 subframes according to the second mode, the driving controller 285 may transmit the coordinate information of the pointer light PL to the signal processing device 170.

Meanwhile, when the plurality of subframe output modes is not the second mode in step S820, the driving controller 285 may determine whether the plurality of subframe output modes is a third mode corresponding to a power saving mode or a stand-by mode (S824), and output only any one of the scan signal and the data signal to the light emitting diode during the plurality of subframe periods when the plurality of subframe output modes corresponds the third mode (S826).

For example, the driving controller 285 may not output each of the scan signal and the data signal during the first frame period Subframe 1 of FIG. 7C, but may output only the scan signal and may not output the data signal during the plurality of subframe periods Subframes 1 to 3.

Accordingly, in the third mode, even any image is not displayed, however, only the pointer light may be sensed.

Meanwhile, when the pointer light PL is sensed in the third mode, the driving controller 285 switches the third mode to the first mode or the second mode to control the pointer image corresponding to the pointer light PL to be displayed. Accordingly, the pointer image based on the pointer light PL can be stably displayed.

Meanwhile, the driving controller 285 may control power supplied to the light emitting diode in the third mode to be less than power supplied to the light emitting diode in the second mode. Accordingly, the pointer light PL can be stably sensed in the third mode while reducing power consumption.

Meanwhile, in a state in which a data line is connected to an anode of the light emitting diode and a scan line is connected to a cathode of the light emitting diode as in FIG. 5B, the driving controller 285 may output the scan signal and the data signal to the light emitting diode during the plurality of subframe periods in the first mode, and output only the scan signal to the light emitting diode during some subframe periods among the plurality of subframe periods in the second mode.

Meanwhile, in the state in which the data line is connected to the anode of the light emitting diode and the scan line is connected to the cathode of the light emitting diode as in FIG. 5B, the driving controller 285 may output only the scan signal to the light emitting diode during the plurality of subframe periods in the third mode. Accordingly, the pointer light PL can be stably sensed in the third mode.

Figure 9:
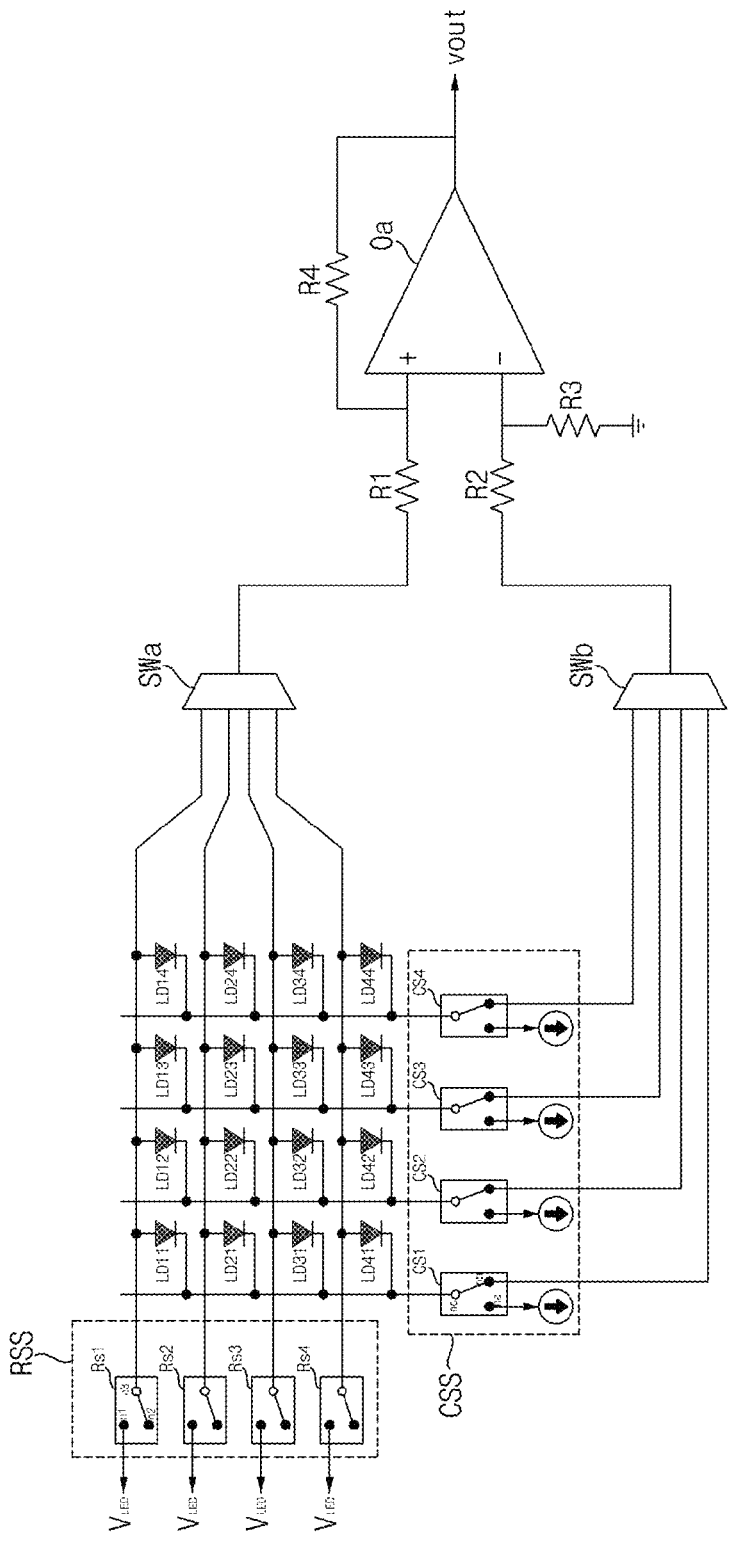
FIGS. 9 to 14C are diagrams referred to in the description of FIG. 8.

Meanwhile, in a state in which the scan line is connected to the anode of the light emitting diode and the data line is connected to the cathode of the light emitting diode as in FIG. 9, the driving controller 285 may output the scan signal and the data signal to the light emitting diode during the plurality of subframe periods in the first mode, and output only the data signal to the light emitting diode during some subframe periods among the plurality of subframe periods in the second mode. Accordingly, the pointer light PL can be stably sensed.

Meanwhile, in the state in which the scan line is connected to the anode of the light emitting diode and the data line is connected to the cathode of the light emitting diode as in FIG. 9, the driving controller 285 may output only the data signal to the light emitting diode during the plurality of subframe periods in the third mode. Accordingly, the pointer light PL can be stably sensed in the third mode.

FIGS. 9 to 14C are diagrams referred to in the description of FIG. 8.

FIG. 9 illustrates one example of an internal circuit diagram of the display apparatus in the image display apparatus according to an embodiment of the present disclosure.

Referring to the drawing, a display apparatus 180a according to an embodiment of the present disclosure includes a plurality of light emitting diodes LD11 to LD44 arranged in a matrix form.

Meanwhile, in the plurality of light emitting diodes LD11 to LD44, the scan line may be connected to the anode of the light emitting diode, and the data line may be connected to the cathode of the light emitting diode unlike FIG. 5B.

Accordingly, the scan signal applied to the light emitting diode may be a positive voltage at a first level LV1, and the data signal applied to the data line may be a voltage at a second level LVm lower than the first level.

The display apparatus 180a according to an embodiment of the present disclosure may include a plurality of first switching drivers RSS that supplies the scan signal or the voltage at the first level LV1 to the anodes of the plurality of light emitting diodes LD11 to LD44 for each first line based on a switching operation during a display mode period Pda which is the first mode.

Meanwhile, the display apparatus 180a according to an embodiment of the present disclosure may include a plurality of second switching drivers CSS that supplies a voltage Sbb at the second level LVm lower than the first level LV1 to the cathodes of the plurality of light emitting diodes LD11 to LD44 for each second line based on the switching operation during the display mode period Pda which is the first mode.

Meanwhile, the display apparatus 180a according to an embodiment of the present disclosure may further include a first switch SWa that outputs the scan signal or the voltage at the first level LV1 during the display mode period Pda which is the first mode, and does not output the scan signal or the voltage at the first level LV1 during a sensing mode period Psa which is a second mode apart from the display mode period Pda.

Meanwhile, the display apparatus 180a according to an embodiment of the present disclosure may further include a second switch SWb that outputs the voltage Sbb at the second level LVm during the display mode period Pda which is the first mode, and outputs a current flowing on at least one of the plurality of light emitting diodes LD11 to LD44 based on the pointer light PL during the sensing mode period Psa which is the second mode.

Meanwhile, the display apparatus 180a according to an embodiment of the present disclosure may further include an amplifier Oa that amplifies a difference DFb between a first line voltage LV2 and a second line voltage LVp based on the current flowing on the light emitting diode during the sensing mode period Psa. Accordingly, the pointer light PL can be stably sensed without a separate optical sensor.

Meanwhile, in the drawing, 16 (4*4) light emitting diodes are exemplified as the plurality of light emitting diodes arranged in the matrix form, but the present disclosure is not limited thereto, and it is possible to arrange light emitting diodes of various numbers of m*n.

Meanwhile, a plurality of first switching drivers RSS may include 4 first switching drivers Rs1 to Rs4 corresponding to 4 scan lines.

Meanwhile, each of the first switching drivers Rs1 to Rs4 includes three nodes, and a third node n3 among first to third nodes n1 to n3 is connected to the anode of each light emitting diode and the first node n1 is connected to the third node n3 by the switching operation in the display mode to deliver the scan signal or the voltage at the first level LV1 to the third node n3, and the second node n2 is connected to the third node n3 by the switching operation in the sensing mode to prevent the scan signal or the voltage at the first level LV1 from being delivered to the third node n3.

Meanwhile, the plurality of second switching drivers CSS may include 4 second switching drivers Cs1 to Cs4 corresponding to 4 data lines.

Meanwhile, each of the second switching drivers Cs1 to Cs4 includes three nodes, and a third node nc among first to third nodes na to nc is connected to the cathode of each light emitting diode and the first node na is connected to the third node nc by the switching operation in the display mode to deliver the voltage at the second level LVm lower than the first level LV1 to the third node nc, and the second node nb is connected to the third nod nc by the switching operation in the sensing mode to prevent the voltage at the second level LVm from being delivered to the third node nc.

That is, in the sensing mode, the second node nb of each of the second switching drivers Cs1 to Cs4 is connected to the second switch SWb.

In the present disclosure, the light emitting diode is emitted during the display mode by using the forward current of the light emitting diode without a separate optical sensor, and the pointer light is sensed during the sensing mode period by using the backward current of the light emitting diode.

Meanwhile, since a magnitude of a level of the backward current of the light emitting diode increases in proportion to an incident light amount of the pointer light, coordinate information and intensity information of the pointer light are secured by using that the magnitude of the level of the backward current increases in the present disclosure.

To this end, the driving controller 285 may operate the plurality of light emitting diodes LD11 to LD44 separately in the display mode period which is the first mode and the sensing mode period which is the second mode.

During the display mode period, the scan signal or the voltage at the first level LV1 is sequentially applied for each of the scan lines of the plurality of light emitting diodes LD11 to LD44, and the voltage at the second level LVm lower than the first level LV1 is sequentially applied for each of the data lines of the plurality of light emitting diodes LD11 to LD44.

Accordingly, during the display mode period, the first level LV1 is supplied to the anode of the light emitting diode, the second level LVM is supplied to the cathode of the light emitting diode, and the forward current flows on the light emitting diode based on a voltage difference between the first level LV1 and the second level LVm to emit the light emitting diode.

During the sensing mode period, a low-level voltage at the level LVc is applied to the scan lines of the plurality of light emitting diodes LD11 to LD44, and a low-level voltage at the level LVn is applied to the data lines of the plurality of light emitting diodes LD11 to LD44. In this case, the level LVc and the level LVn may also be equal to each other.

Accordingly, during the sensing mode period, the forward current does not flow on the plurality of light emitting diodes LD11 to LD44, which is not emitted.

Meanwhile, during the sensing mode period, when the pointer light PL is incident on a specific light emitting diode location, e.g., the light emitting diode LD33, a cathode voltage of the light emitting diode LD33 is increased by a light amount of the pointer light PL, which becomes larger than an anode voltage.

Therefore, the backward current flows on the light emitting diode LD33, and the first line voltage LVc which is the anode voltage of the light emitting diode LD33 is supplied to the first switch SWa, and the second line voltage LVp which is the cathode voltage of the light emitting diode LD33 is supplied to the second switch SWb.

In addition, the amplifier Oa amplifies a difference DFb between the first line voltage LVc and the second line voltage LVp based on the current flowing on the light emitting diode LD33.

Accordingly, during the sensing mode period, the coordinate information of the pointer light PL may be output based on the backward current flowing on the light emitting diode LD33.

In particular, the driving controller 285 controls the switching operations of the first switch SWa and the second switch SWb during the sensing mode period Psa, so the sensing interface 239 may output, to the timing controller 232 or the second interface 231, the coordinate information of the pointer light PL based on the signal output through the amplifier Oa.

Specifically, the driving controller 285 may control the first switching drivers Rs1 to Rs4 to be sequentially driven, and the second switching drivers Cs1 to Cs4 to be sequentially driven, during sensing mode period Psa.

In addition, upon sequentially driving the first switching drivers Rs1 to Rs4 and the second switching drivers Cs1 to Cs4 by the driving controller 285, the sensing interface 239 may compute and output the coordinate information of the pointer light PL based on a timing of the signal output by the amplifier Oa.

Meanwhile, although not illustrated in FIG. 9, the display apparatus 180 according to an embodiment of the present disclosure may further include a first driver 234 that outputs the scan signal or the voltage at the first level LV1 to the plurality of first switching drivers RSS and a second driver 236 that outputs the voltage Sbb at the second level LVm to the plurality of second switching drivers CSS.

Here, the first driver 234 may correspond to the gate driver 234 of FIG. 5, and the second driver 236 may correspond to the data driver 236 of FIG. 5.

FIGS. 10A to 11E are diagrams referred to in the description of FIG. 9.

Figure 10A:
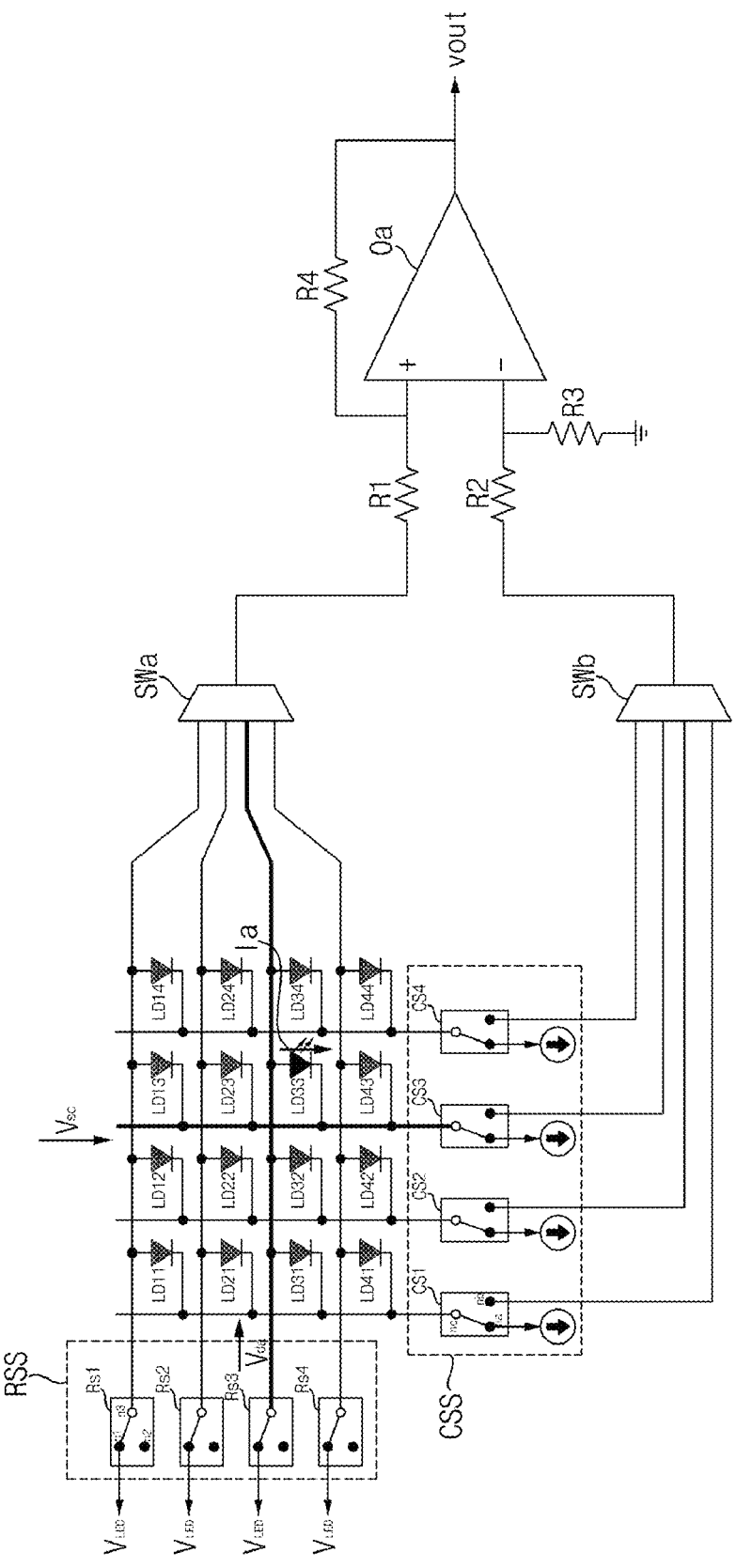

FIG. 10A is a diagram illustrating an operation of the display apparatus 180a in the display mode.

During the display mode period, the scan signal or the voltage at the first level LV1 is sequentially applied for each of the scan lines of the plurality of light emitting diodes LD11 to LD44.

To this end, during the display mode period, the first nodes n1 of each of the first switching drivers Rs1 to Rs4 are connected to the third nodes n3 to sequentially apply the scan signal or the voltage at the first level LV1 for each scan line.

Alternatively, during the display mode period, the first nodes n1 of the first switching drivers Rs1 to Rs4 are sequentially connected to the third nodes n3 to sequentially apply the scan signal or the voltage at the first level LV1 for each scan line.

Meanwhile, during the display mode period, the voltage at the second level LVm lower than the first level LV1 is sequentially applied for each of the data lines of the plurality of light emitting diodes LD11 to LD44.

To this end, during the display mode period, the first nodes na of the second switching drivers Cs1 to Cs4 are connected to the third nodes nc to sequentially apply the voltage at the second level LVm for each data line.

Alternatively, during the display mode period, the first nodes na of the first switching drivers Cs1 to Cs4 are sequentially connected to the third nodes nc to sequentially apply the voltage at the second level LVm for each data line.

Accordingly, during the display mode period, the first level LV1 is supplied to the anode of the light emitting diode, the second level LVM is supplied to the cathode of the light emitting diode, and the forward current flows on the light emitting diode based on a voltage difference DFa between the first level LV1 and the second level LVm to emit the light emitting diode.

In particular, as in FIG. 10A, the first level LV1 is supplied to the anode of the light emitting diode LD33, the second level LVM is supplied to the cathode of the light emitting diode LD33, and the forward current Ia flows on the light emitting diode LD33 based on the voltage difference DFa between the first level LV1 and the second level LVm to emit the light emitting diode LD33.

Figure 10B:
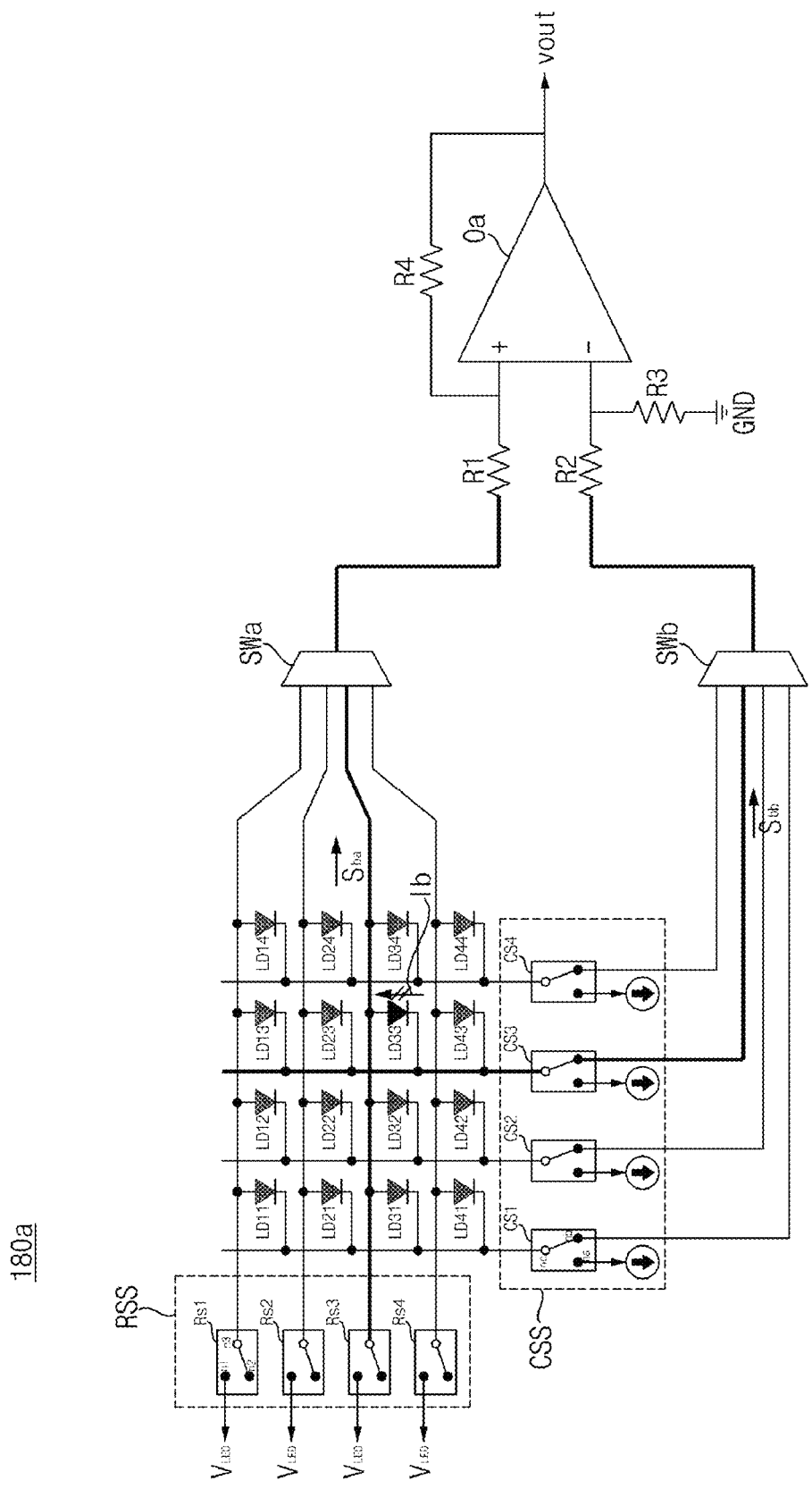

FIG. 10B is a diagram illustrating an operation of the display apparatus 180a in the sensing mode.

During the sensing mode period, the low-level voltage at the level LVc may be applied to the scan lines of the plurality of light emitting diodes LD11 to LD44.

To this end, during the sensing mode period, the second nodes n1 of the first switching drivers Rs1 to Rs4 are connected to the third nodes n3 to not apply the scan signal or the voltage at the first level LV1, but apply the low-level voltage at the level LVc, for each scan line.

Meanwhile, during the sensing mode period, the low-level voltage at the level LVn may be applied to the data lines of the plurality of light emitting diodes LD11 to LD44. In this case, the level LVc and the level LVn may also be equal to each other.

To this end, during the sensing mode period, the second nodes n1 of the second switching drivers Cs1 to Cs4 are connected to the third nodes n3 to not apply the voltage at the second level LV2, but apply the low-level voltage at the level LVn, for each data line.

Accordingly, during the sensing mode period, the forward current does not flow on the plurality of light emitting diodes LD11 to LD44, which is not emitted.

Meanwhile, during the sensing mode period, when the pointer light PL is incident on a specific light emitting diode location, e.g., the light emitting diode LD33, a cathode voltage of the light emitting diode LD33 is increased by a light amount of the pointer light PL, which becomes larger than an anode voltage.

Therefore, the backward current I2 flows on the light emitting diode LD33, and the first line voltage LVc which is the anode voltage of the light emitting diode LD33 is supplied to the first switch SWa, and the second line voltage LVp which is the cathode voltage of the light emitting diode LD33 is supplied to the second switch SWb.

In addition, the amplifier Oa amplifies a difference DFb between the first line voltage LVc and the second line voltage LVp based on the current flowing on the light emitting diode LD33.

Accordingly, during the sensing mode period, the coordinate information of the pointer light PL may be output based on the backward current flowing on the light emitting diode LD33.

FIG. 10C is a diagram illustrating an amplification process based on the current flowing on the light emitting diode LD33 of FIG. 10B.

Referring to the drawing, when the pointer light PL is incident on the light emitting diode LD33, the backward current I2 flows on the light emitting diode LD33 by the light amount of the pointer light PL, and a first line voltage Ssa which is an anode voltage of the light emitting diode LD33 is supplied to the first switch SWa, and a second line voltage Ssb which is a cathode voltage of the light emitting diode LD33 is supplied to the second switch SWb.

The amplifier Oa amplifies a difference DFb between the first line voltage LVc and the second line voltage LVp based on the current flowing on the light emitting diode LD33.

Meanwhile, the first switch SWa and a resistor element R1 are connected to a first input terminal of the amplifier Oa, and the second switch SWb, a resistor element R2, and a resistor element R3 are connected to a second input terminal of the amplifier Oa. The resistor element R2 and the resistor element R3 may be connected in parallel.

It is preferable that a resistor element R4 is connected between the first input terminal and an output terminal of the amplifier Oa, and a resistance value of the resistor element R4 is larger than resistance values of the resistor elements R1, R2, and R3.

Figure 10D:
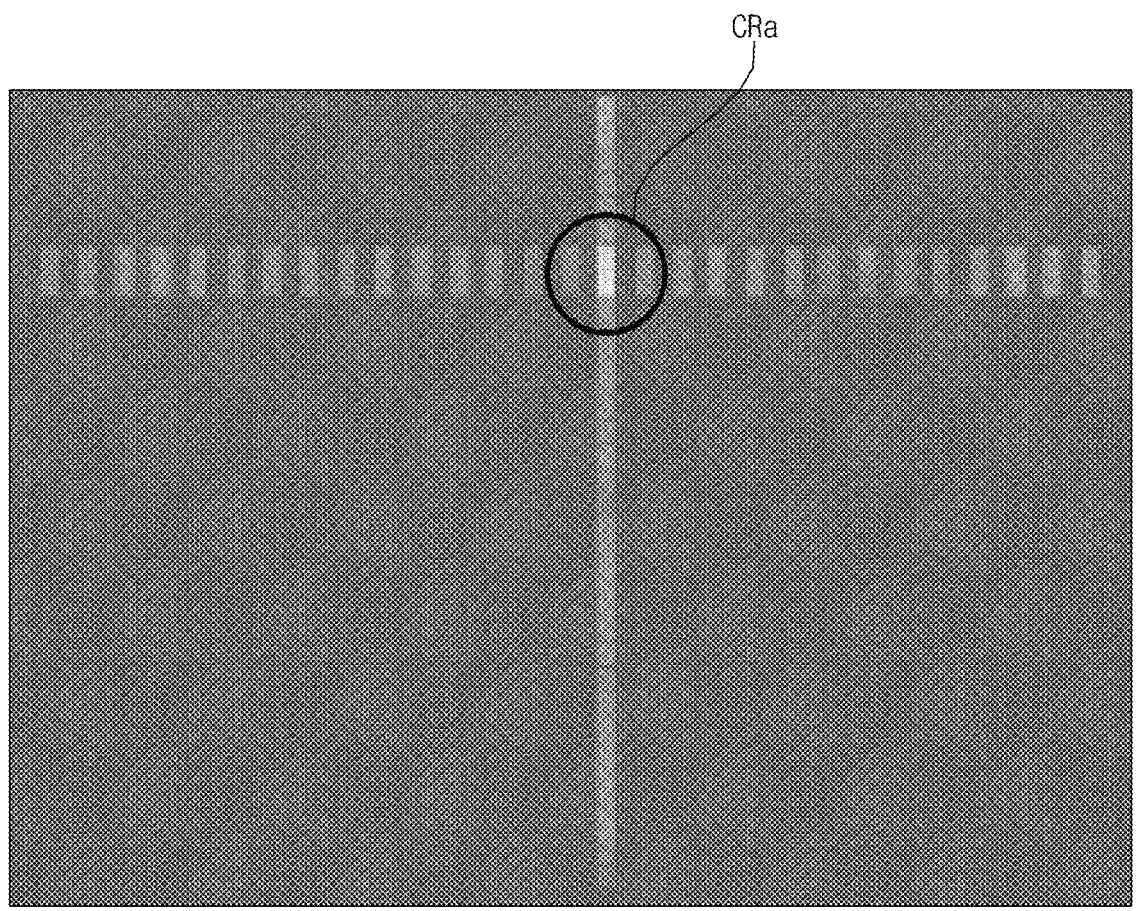

FIG. 10D is a diagram illustrating the coordinate information of the pointer light PL.

Referring to the drawing, the display apparatus 180a may compute coordinate information CRa of the pointer light PL based on an output of the amplifier Oa.

FIG. 11A is a diagram illustrating a scan signal at the first level LV1 during the display period, and the second level LVm.

Referring to the drawing, during the display mode period, each of the first switching drivers Rs1 to Rs4 may sequentially output the scan signal at the first level LV1 for each scan line as in (a) of FIG. 11A.

Accordingly, the scan signal at the first level LV1 which is a high level is sequentially applied for each of the scan lines of the plurality of light emitting diodes.

In the drawing, it is exemplified that the voltage at the first level LV1 is applied to the first scan line during a period of T1 to T2, the voltage at the first level LV1 is applied to the second scan line during a period of T2 to T3, the voltage at the first level LV1 is applied to the first scan line during a period of T3 to T4, and the voltage at the first level LV1 is applied to the first scan line during a period of T4 to T5.

Meanwhile, during the display mode period, each of the second switching drivers Cs1 to Cs4 may sequentially output the voltage at the second level LVm for each data line as in (b) of FIG. 11A.

Accordingly, the voltage at the second level LVm is sequentially applied for each of the data lines of the plurality of light emitting diodes.

In the drawing, it is exemplified that the voltage at the second level LVm is applied to the first data line during a period of T1 to T12, the voltage at the second level LVm is applied to the second data line during a period of T2 to T23, the voltage at the second level LVm is applied to the first data line during a period of T3 to T34, and the voltage at the second level LVm is applied to the first data line during a period of T4 to T45.

Meanwhile, unlike the drawing, it is also possible that the voltage at the second level LVm is applied to the first data line during the period of T1 to T2, the voltage at the second level LVm is applied to the second data line during the period of T2 to T3, the voltage at the second level LVm is applied to the first data line during the period of T3 to T4, and the voltage at the second level LVm is applied to the first data line during the period of T4 to T5.

Meanwhile, unlike the drawing, it is also possible that the voltage at the second level LVm is applied to the first data line during a period of T12 to T2, the voltage at the second level LVm is applied to the second data line during a period of T23 to T3, the voltage at the second level LVm is applied to the first data line during a period of T34 to T4, and the voltage at the second level LVm is applied to the first data line during a period of T45 to T5.

Figure 11B:
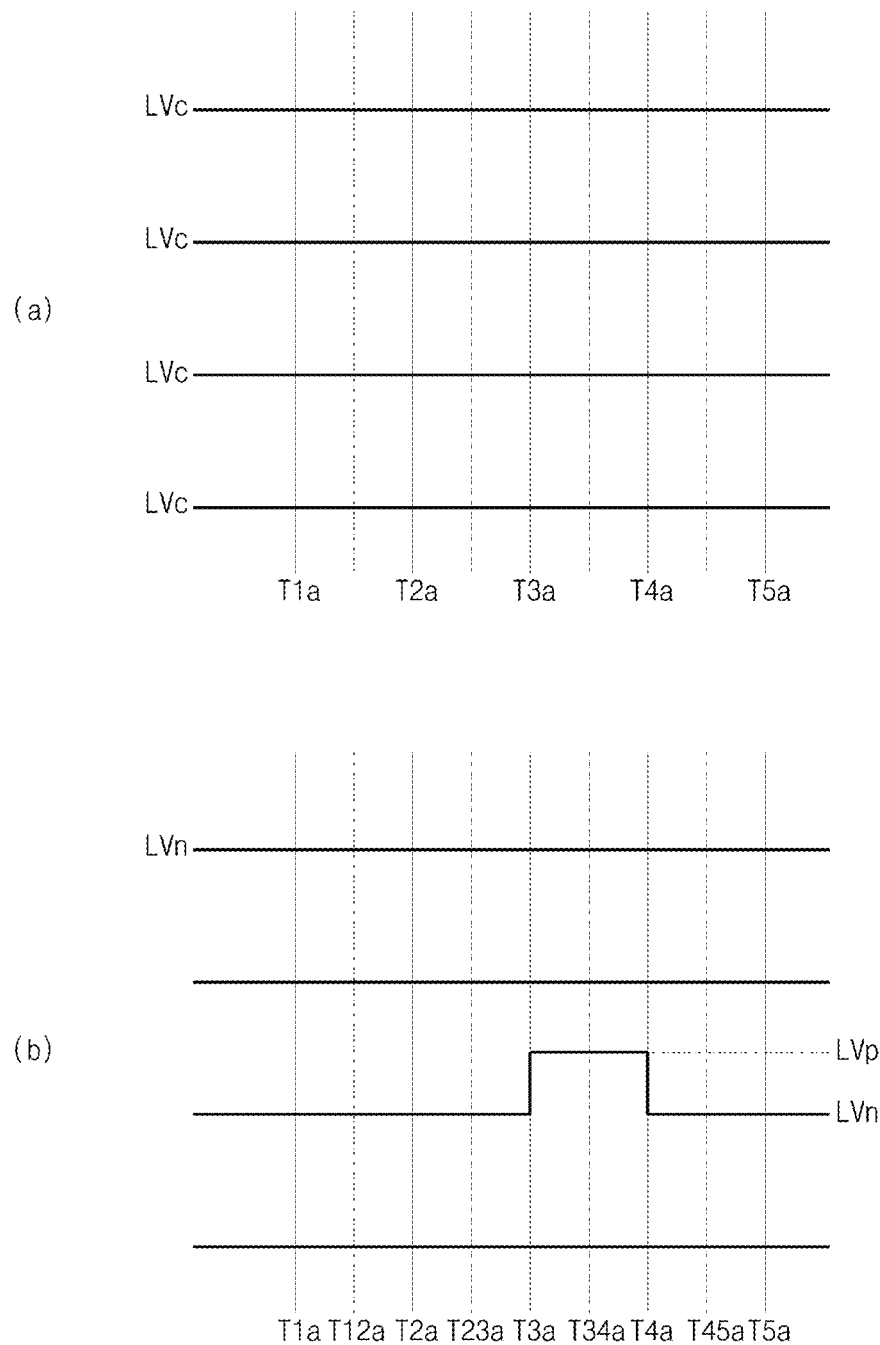

FIG. 11B is a diagram exemplifying the low level LVc supplied to the scan line and the low level LVn supplied to the data line during a scan mode period.

Referring to the drawing, during the scan mode period, each of the first switching drivers Rs1 to Rs4 may sequentially output the voltage at the low level LVc to the scan line as in (a) of FIG. 11B.

In the drawing, it is exemplified that the voltage at the low level LVc is output to the scan line during a period of T1a to T5a.

Meanwhile, during the scan mode period, each of the second switching drivers Cs1 to cs4 may sequentially output the voltage at the low level LVn to the data line as in (b) FIG. 11B.

In the drawing, it is exemplified that the voltage at the low level LVn is output to the scan line during the period of T1a to T5a.

In this case, when the pointer light PL is incident on the light emitting diode LD33, the cathode voltage of the light emitting diode LD33 is increased by the light amount of the pointer light PP, which becomes larger than the anode voltage.

Therefore, as in (b) FIG. 11B, a voltage at the level LVp which is larger than the low level LVn is applied to the cathode of the light emitting diode LD33 during the T3a to T4a.

Figure 11C:
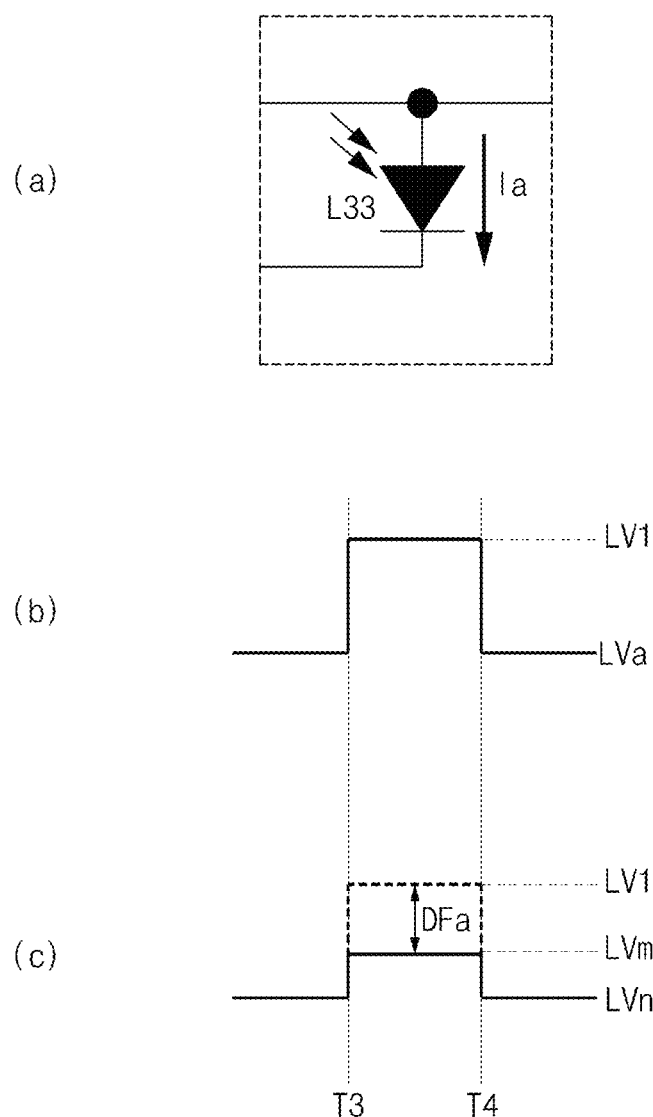

FIG. 11C is a diagram exemplifying that the light emitting diode LD33 is emitted during the display mode period of FIG. 11A.

Referring to the drawing, during the display mode period, the scan signal or the voltage at the first level LV1 is applied to the anode of the light emitting diode LD33 as in (b) of FIG. 11C, the second level LVm is supplied to the cathode of the light emitting diode as in (c) of FIG. 11C, and the forward current Ia flows on the light emitting diode LD33 to emit the light emitting diode LD33 based on the voltage difference DFa between the first level LV1 and the second level LVm as in (a) of FIG. 11C.

FIG. 11D is a diagram exemplifying that the backward current flows on the light emitting diode LD33 during the sensing mode period of FIG. 11B.

Referring to the drawing, during the display mode period, as in (b) of FIG. 11D, the voltage at the low level LVc is applied to the anode of the light emitting diode LD33 and the voltage at the high level LVp other than the voltage at the low level LVn is applied to the cathode of the light emitting diode as the pointer light PL is incident, and as in (a) of FIG. 11D, the backward current Ib flows on the light emitting diode LD33 based on the difference DFb between the low-level voltage LVc and the high-level voltage LVp, which is the difference DFb between the first line voltage LVc and the second line voltage LVp.

Accordingly, the first line voltage Lvc is supplied to the first switch SWa and the second line voltage LVp which is the cathode voltage of the light emitting diode LD33 is supplied to the second switch SW to calculate the coordinate information of the pointer light PL.

Figure 11E:
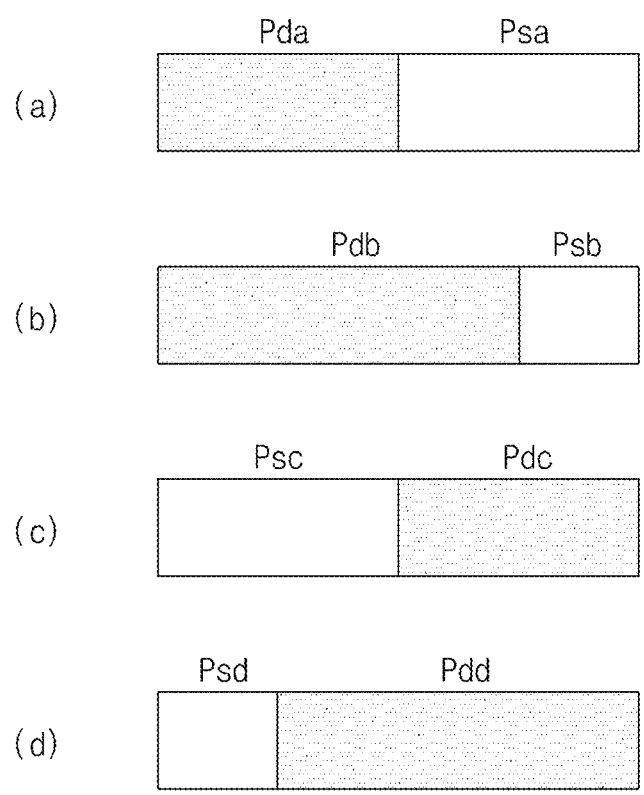

FIG. 11E is a diagram exemplifying various period settings in the display mode and the sensing mode.

The driving controller 285 may control the display mode period and the sensing mode period.

For example, the driving controller 285 may control the sensing mode period to be performed after the display mode period is performed.

As another example, the driving controller 285 may control the display mode period to be performed after the sensing mode period is performed.

Meanwhile, the driving controller 285 may vary the display mode period and the sensing mode period.

For example, the driving controller 285 may control the sensing mode period and the display mode period to be equal to each other.

As another example, the driving controller 285 may control the display mode period to be longer than the sensing mode period.

As yet another example, the driving controller 285 may control the display mode period to be shorter than the sensing mode period.

(a) FIG. 11E exemplifies that the sensing mode period Psa is performed after the display mode period Pda, and the display mode period Pda and the sensing mode period Psa are equal to each other.

Referring to the drawing, during the display mode period Pda, a first-direction current Ia may flow on at least some of the plurality of light emitting diodes LD11 to LD44, and during the sensing mode period Psa, a second-direction current Ib opposite to a first direction may flow on at least some of the plurality of light emitting diodes LD11 to LD44. Accordingly, the light emitting diode can be emitted based on the first-direction current during the display mode period Pda and the pointer light can be stably sensed without the separate optical sensor based on the second-direction current which is the reverse direction during the sensing mode period Psa.

Meanwhile, during the display mode period Pda, the first-direction current Ia may flow on at least some of the plurality of light emitting diodes LD11 to LD44, in response to a difference DFa between a first-level (LV1) voltage Sba and a second-level (LV2) voltage Sbb, and during the sensing mode period Psa, a second-direction current Ib opposite to the first direction may flow on at least some of the plurality of light emitting diodes LD11 to LD44. Accordingly, the pointer light can be stably sensed without a separate optical sensor during the sensing mode period Psa.

Meanwhile, the anode voltage of the light emitting diode on which the pointer light PL is incident is lower in the sensing mode period Psa than in the display mode period Pda, and the cathode voltage of the light emitting diode on which the pointer light PL is incident is higher in the sensing mode period Psa than in the display mode period Pda. Accordingly, the pointer light can be stably sensed without a separate optical sensor during the sensing mode period Psa.

Meanwhile, the driving controller 285 may control the first plurality of switching drivers RSS and the plurality of second switching drivers CSS to be sequentially driven during the sensing mode period Psa, and the sensing interface 239 may output coordinate information Sse of the pointer light based on sequential driving of the plurality of first switching drivers RSS and the plurality of second switching drivers CSS. Accordingly, the coordinate information Sse of the pointer light corresponding to the sensed pointer light PL can be stably output.

Meanwhile, the sensing interface 239 may output intensity information of the pointer light corresponding to a level of the difference DFb between the first line voltage LVc and the second line voltage LVp. Accordingly, intensity information of the pointer light corresponding to the sensed pointer light PL can be stably output.

Meanwhile, the plurality of second switching drivers CSS outputs a second level (LVm) voltage Sbb during the display mode period Pda, and does not output the second-level (LVm) voltage Sbb during the sensing mode period Psa. Accordingly, the pointer light PL can be stably sensed without a separate optical sensor during the sensing mode period Psa.

(b) of FIG. 11E exemplifies that the sensing mode period Psb is performed after the display mode period Pdb, and the display mode period Pdb is longer than the sensing mode period Psb.

(c) of FIG. 11E exemplifies that the display mode period Pdc is performed after the sensing mode period Psc, and the sensing mode period Psc and the display mode period Pdc are equal to each other.

(d) of FIG. 11E exemplifies that the display mode period Pdd is performed after the sensing mode period Psd, and the sensing mode period Psd is shorter than the display mode period Pdd.

Meanwhile, when pointing coordinate information corresponding to the pointer light PL is not detected during the sensing mode period, the driving controller 285 may control the display mode period to be performed longer than the sensing mode period.

For example, when the pointing coordinate information corresponding to the pointer light PL is not detected during the sensing mode period Psa in the state in which the display mode period Pda and the sensing mode period Psa are equal to each other as in (a) of FIG. 11E, the driving controller 285 may control the display mode period Pdb to be performed longer than the sensing mode period Psb as in (b) of FIG. 11E. Accordingly, the sensing mode period can be flexibly controlled.

Meanwhile, when the pointing coordinate information corresponding to the pointer light PL is detected during the sensing mode period, the driving controller 285 may control the display mode period to be equal to or shorter than the sensing mode period.

For example, when the pointing coordinate information corresponding to the pointer light PL is detected during the sensing mode period Psa while the display mode period Pdb is performed longer than the sensing mode period Psb as in (b) of FIG. 11E, the driving controller 285 may control the display mode period Pdb and the sensing mode period Psa to be equal to each other or the sensing mode period to be longer in (a) of FIG. 11E. Accordingly, the sensing mode period can be flexibly controlled.

Meanwhile, when the display mode period is shorter than the sensing mode period, the driving controller 285 may control the level of the scan signal or the first level LV1 to be larger or the level of the second level LVm to be less.

That is, the driving controller 285 may control a difference between the first level and the second level to be larger as the display mode period is shorter than the sensing mode period. Accordingly, luminance attenuation of the display mode period which becomes shorter may be compensated with the level difference which becomes larger.

Figure 12A:
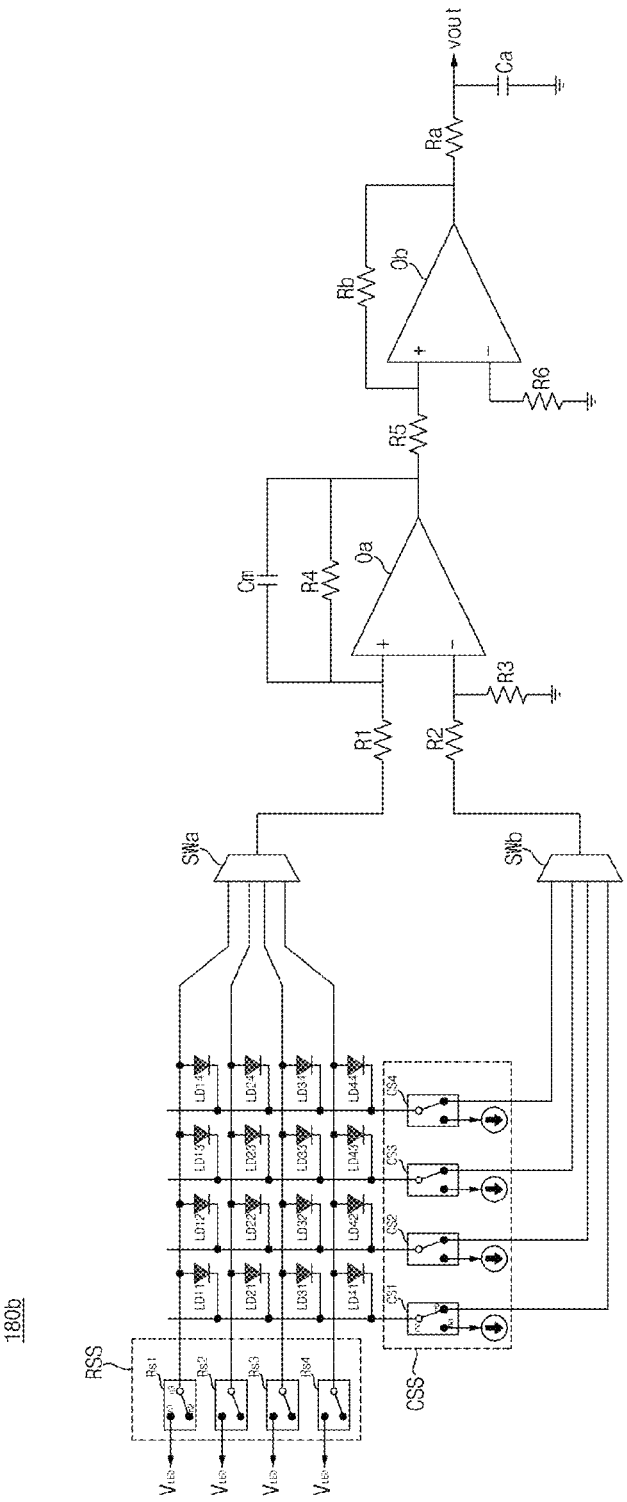

FIG. 12A illustrates one example of an internal circuit diagram of a display apparatus according to another embodiment of the present disclosure.

Referring to the drawing, the display apparatus 180b according to another embodiment of the present disclosure includes a plurality of light emitting diodes LD11 to LD44 arranged in a matrix form, a plurality of first switching drivers RSS supplying a scan signal or a voltage at a first level LV1, for each first line, to anodes of the plurality of light emitting diodes LD11 to LD44 based on a switching operation during a display mode period Pda, a plurality of second switching drivers CSS supplying a voltage at a second level LVm lower than the first level LV1, for each second line, to cathodes of the plurality of light emitting diodes LD11 to LD44 based on the switching operation during the display mode period Pda, a first switch SWa outputting the scan signal or the voltage at the first level LV1 during the display mode period Pda and not output the scan signal or the voltage at the first level LV1 during a sensing mode period Psa apart from the display mode period Pda, a second switch SWb outputting a voltage Sbb at a second level LVm during the display mod period Pda and output a current flowing on at least one of the plurality of light emitting diodes LD11 to LD44 based on a pointer light PL during the sensing mode period Psa, and multi-stage amplifiers Oa and OPb amplifying a difference DFb between a first line voltage LVc and a second line voltage LVp based on the current flowing on the light emitting diode during the sensing mode period Psa.

That is, the display apparatus 180b of FIG. 12A is similar to the display apparatus 180a of FIG. 9, but different from the display apparatus 180a in terms of including the multi-stage amplifiers Oa and OPb.

When the difference is primarily described, the display apparatus 180b of FIG. 12A may further include a resistor element Ra and a capacitor element Ca at output terminals of the multi-stage amplifiers Oa and OPb. Accordingly, the pointer light PL can be stably sensed without a separate optical sensor during the sensing mode based on a signal from which noise is removed.

The first switch SWa and a resistor element R1 are connected to a first input terminal of a first-stage amplifier Oa among the multiple-stage amplifiers Oa and OPb, and the second switch SWb, a resistor element R2, and a resistor element R3 are connected to a second input terminal of the first-stage amplifier Oa.

A resistor element R4 and a capacitor element Cm are connected between the first input terminal and the output terminal of the first-storage amplifier Oa in parallel, a resistor element R5 is connected between the output terminal of the first-stage amplifier Oa and a first input terminal of a second-stage amplifier Ob, and a resistor element R6 is connected to a second input terminal of the second-stage amplifier Ob.

The resistor element Rb is connected between the first input terminal and the output terminal of the second-stage amplifier Ob, and the resistor element Ra and the capacitor element Ca are connected to the output terminal of the second-stage amplifier Ob.

The difference DFb between the first line voltage LVc and the second line voltage LVp input into the multiple-stage amplifiers Oa and OPb is amplified through the multiple-stage amplifiers Oa and OPb, and noise is removed through the resistor element Ra and the capacitor element Ca.

Therefore, the multiple-stage amplifiers Oa and OPb may output a signal with reduced noise by the resistor element Ra and the capacitor element Ca connected to the output terminal of the multiple-stage amplifier Oa. Accordingly, the pointer light PL can be stably sensed without a separate optical sensor during the sensing mode period based on the signal from which noise is removed.

Meanwhile, a resistance value of a resistor element R4 connected to the first-stage amplifier Oa is preferably larger than a resistance value of the resistor element Rb connected to a second-stage amplifier Ob after the first-stage amplifier Oa. Accordingly, the pointer light PL can be stably sensed without a separate optical sensor during the sensing mode period based on the signal from which noise is removed.

FIG. 12B is a view referred to for an operation description of FIG. 12A.
  (a) FIG. 12B exemplifies a difference CLx between the first line voltage LVc and the second line voltage LVp input into the input terminals of the multiple-stage amplifiers Oa and OPb.
  (a) of FIG. 12B exemplifies a signal Clm from which noise is removed through the resistor element Ra and the capacitor element Ca of the multiple-stage amplifiers Oa and OPb. Accordingly, the pointer light PL can be stably sensed without a separate optical sensor during the sensing mode period based on the signal from which noise is removed.

Figure 12C:
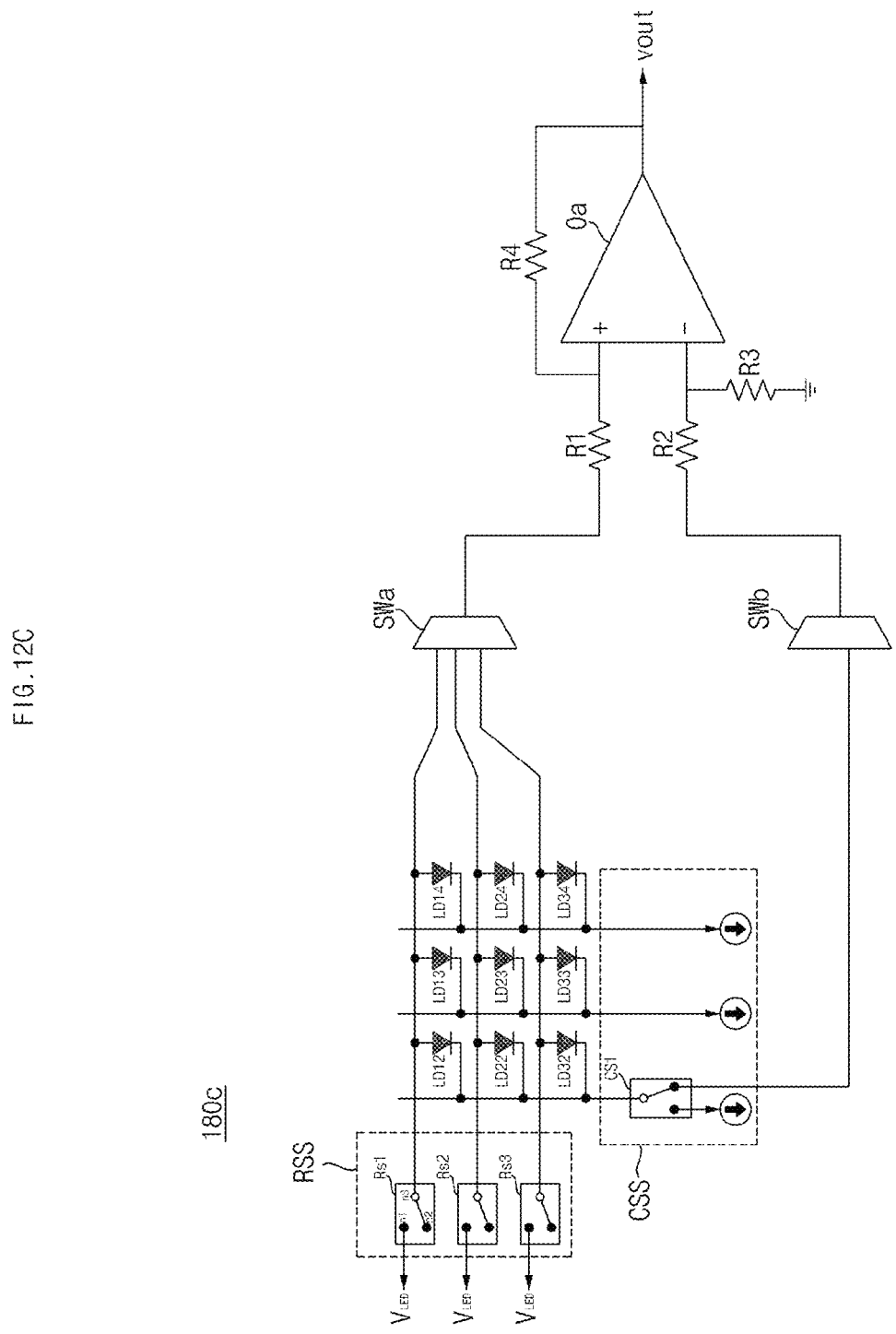

FIG. 12C illustrates one example of an internal circuit diagram of a display apparatus in an image display apparatus according to yet another embodiment of the present disclosure.

The display apparatus 180c according to yet another embodiment of the present disclosure includes a plurality of light emitting diodes LD11 to LD33 arranged in a matrix form, a plurality of first switching drivers RSS supplying a scan signal or a voltage at a first level LV1, for each first line, to anodes of the plurality of light emitting diodes LD11 to LD33 based on a switching operation during a display mode period Pda, and a second switching driver CSS supplying a voltage Sbb at a second level LVm lower than the first level LV1, for each second line, to cathodes of the plurality of light emitting diodes LD11 to LD33 during the display mod period Pda.

Meanwhile, the display apparatus 180c according to yet according to embodiment of the present disclosure may further include a first switch SWa that outputs the scan signal or the voltage at the first level LV1 during the display mode period Pda, and does not output the scan signal or the voltage at the first level LV1 during a sensing mode period Psa apart from the display mode period Pda.

Further, the display apparatus 180c according to yet another embodiment of the present disclosure may further include a second switch SWb that outputs the voltage Sbb at the second level LVm during the display mode period Pda, and outputs a current flowing on at least one of the plurality of light emitting diodes LD11 to LD33 based on the pointer light PL during the sensing mode period Psa.

Meanwhile, the display apparatus 180c according to yet another embodiment of the present disclosure may further include an amplifier Oa that amplifies a difference DFb between a first line voltage LVc and a second line voltage LVp based on the current flowing on the light emitting diode during the sensing mode period Psa.

Light emitting diodes L11, L21, and L31 of a first data line among the plurality of light emitting diodes LD11 to LD33 may be red light emitting diodes, light emitting diodes LD12, LD22, and LD32 of a second data line may be green light emitting diodes, and Light emitting diodes LD13, LD23, and LD33 of a third data line may be blue light emitting diodes.

In a display mode, the light emitting diodes L11, L21, and L31 of the first data line may be the red light emitting diodes, the light emitting diodes LD12, LD22, and LD32 of the second data line may be the green light emitting diodes, and the light emitting diodes LD13, LD23, and LD33 of the third data line may be the blue light emitting diodes.

Meanwhile, since the red light emitting diode shows more excellent photoelectric conversion efficiency upon incidence of the pointer light than the red and blue light emitting diodes, it is also possible to perform a sensing mode only in the red light emitting diode.

Meanwhile, the second switching driver CSS may include one switching driver Css1 for the red light emitting diode other than three switching drivers.

In addition, a second node nb of one switching driver Css1 connected to the light emitting diodes L11, L21, and L31 of the first data line is connected the second switch SWb.

Accordingly, the number of switching drivers can be reduced as compared with the display apparatus 180a of FIG. 9.

FIGS. 13A to 13E are diagrams referred to in the description of the image display apparatus according to an embodiment of the present disclosure.

Figure 13A:
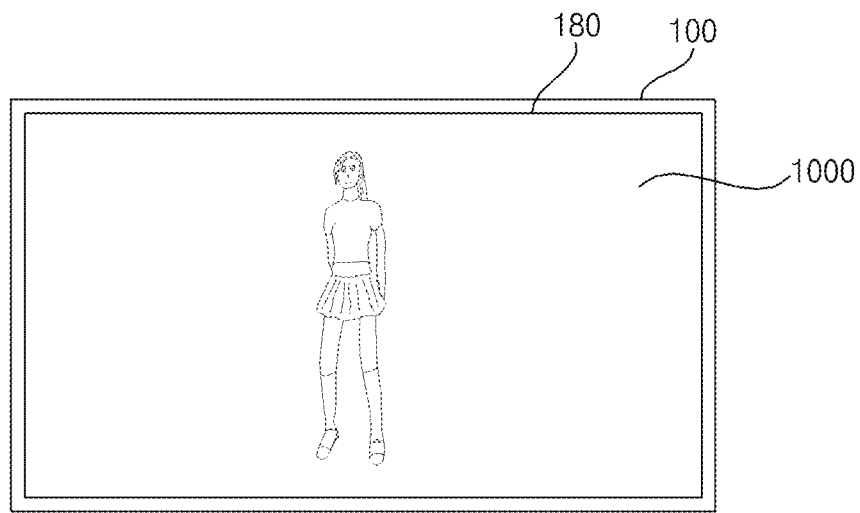

FIG. 13A exemplifies that an image 1000 is displayed in the display apparatus 180 of the image display apparatus 100.

The signal processing device 170 outputs an image signal to the display apparatus 180, and Accordingly, the image 1000 may be displayed as in FIG. 13A.

Figure 13B:
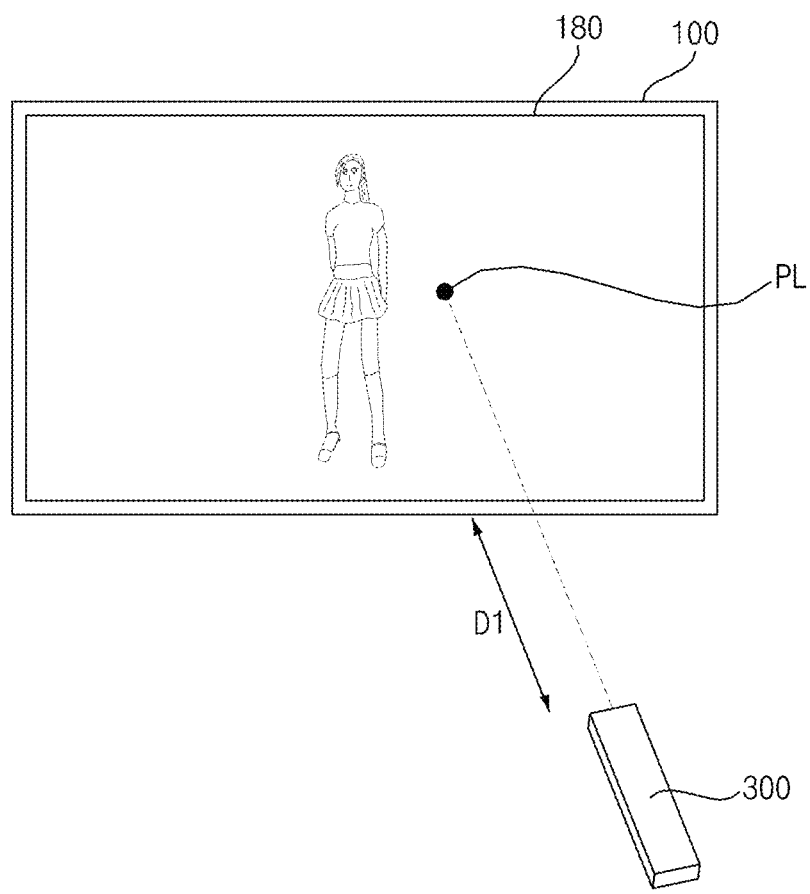

FIG. 13B exemplifies that a pointer light PL from a pointing device 300 spaced apart from a first distance D1 is incident on the display apparatus 180 during the display of the image.

In this case, the pointer light PL may be a laser light.

As described above, during the display mode period, the image 1000 is displayed by light emission based on forward current of the plurality of light emitting diodes, and during the sensing mode period, when the pointer light PL is incident on some of the plurality of light emitting diodes, a pointing coordinate is sensed by backward current of the light emitting diode.

Accordingly, the signal processing device 170 may receive coordinate information of the pointer light PL from the display apparatus 180, and output an image signal including a pointer image 201 to the display apparatus 180 based on the coordinate information of the pointer light PL from the display apparatus 180.

FIG. 13C exemplifies that the pointer image 201 is displayed based on the coordinate information of the pointer light PL from the display apparatus 180 during the display of the image 1000.

Figure 13D:
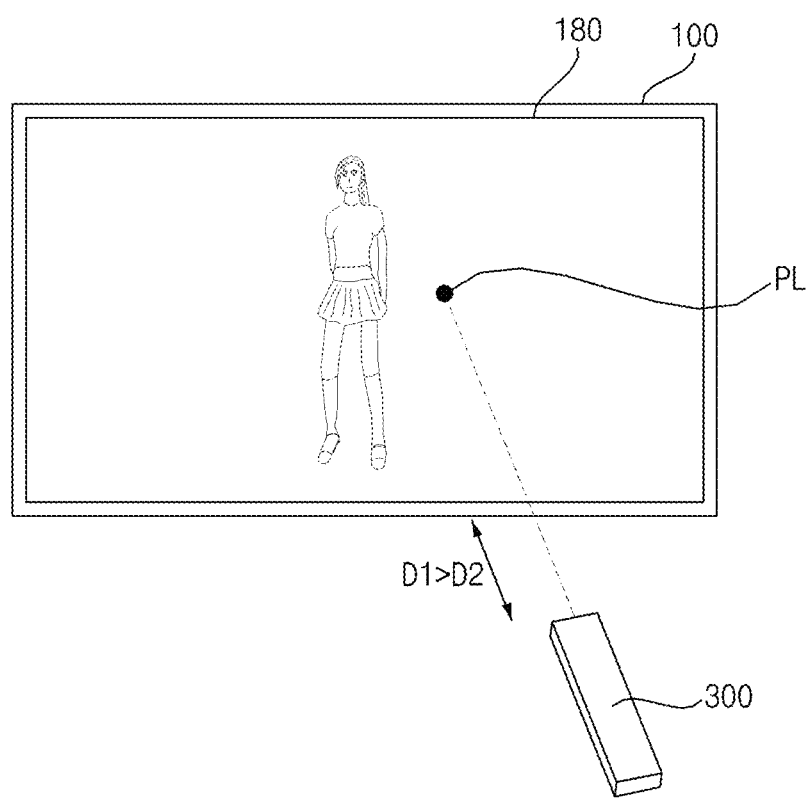

FIG. 13D exemplifies that the pointer light PL from the pointing device 300 spaced apart from a second distance D2 closer than the first distance D1 is incident on the display apparatus 180 during the display of the image.

When the pointer light PL from the pointing device 300 space apart from the second distance D2 closer than the first distance D1 is incident, a difference DFb between a first line voltage LV2 and a second line voltage LVp is further increased in the sensing mode.

Based thereon, the display apparatus 180 may transmit intensity information of the pointer light PL to the signal processing device 170.

Accordingly, the signal processing device 170 may receive coordinate information of the pointer light PL from the display apparatus 180, and output an image signal including a pointer image 201 of which size or luminance is varied to the display apparatus 180 based on the intensity information of the pointer light PL from the display apparatus 180.

FIG. 13E exemplifies that a pointer image 201b is displayed based on the coordinate information of the pointer light PL from the display apparatus 180 during the display of the image 1000.

FIG. 13E exemplifies that the size of the pointer image 201b is further increased or the luminance is further increased because the intensity of the pointer light PL is the greater as compared with FIG. 13C.

Accordingly, the pointer image 201 in which the size is varied can be displayed based on the intensity information of the pointer light PL.

Figure 14A:
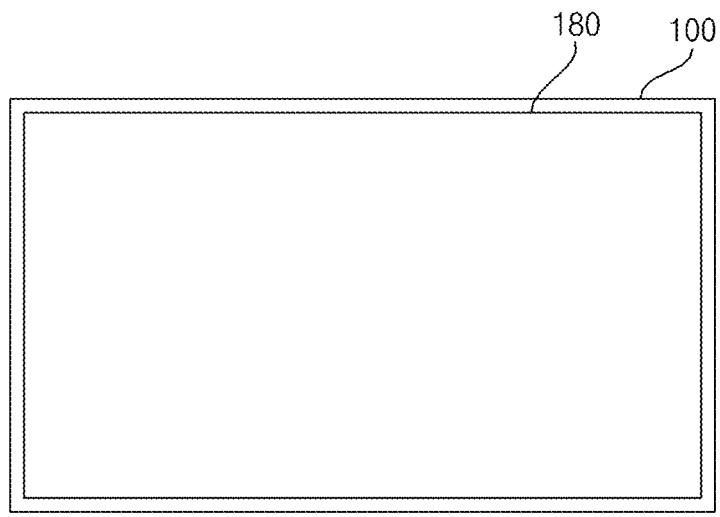

FIG. 14A exemplifies that a third mode corresponding to a power saving mode or a stand-by mode is performed.

Referring to the drawing, only a scan signal may be applied or only a data signal may be applied during a plurality of subframe periods as the third mode is performed.

Accordingly, as in the drawing, no image is displayed in the display 180 of the image display apparatus 100.

Figure 14B:
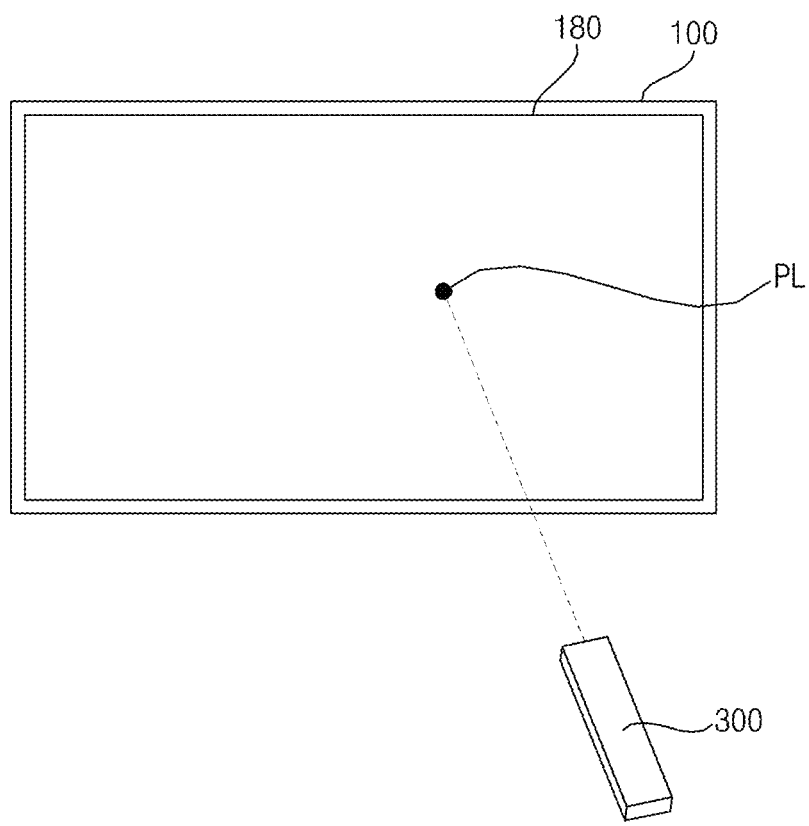

FIG. 14B exemplifies that a pointer light PL from a pointing device 300 spaced apart from a first distance D1 is incident on the display apparatus 180 during the power saving mode or the stand-by mode.

Meanwhile, during the sensing mode period, when the pointer light PL is incident on some of the plurality of light emitting diodes, the pointing coordinate is sensed by the backward current of the light emitting diode.

Accordingly, the signal processing device 170 in the image display apparatus 100 may receive coordinate information of the pointer light PL from the display apparatus 180, and output an image signal including a pointer image 201 to the display apparatus 180 based on the coordinate information of the pointer light PL from the display apparatus 180.

Meanwhile, when the pointer light PL is sensed in the third mode, the driving controller 285 switches the third mode to the first mode or the second mode to control the pointer image corresponding to the pointer light PL to be displayed.

FIG. 14C exemplifies that the pointer image 201 is displayed based on the coordinate information of the pointer light PL from the display apparatus 180.

In this case, other images are not displayed, and as in the drawing, only the pointer image 201 may be disposed. Accordingly, the pointer light PL can be stably sensed in the third mode while reducing power consumption, and based thereon, the pointer image 201 may be displayed.

While the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

What is claimed is:
1. An image display apparatus comprising:
a panel including a plurality of light emitting diodes configured for displaying and for sensing a pointer light; and a driving controller configured to output a scan signal to a light emitting diode of the plurality of light emitting diodes for each of a plurality of subframe periods,
wherein the driving controller is configured to:
output a scan signal and a data signal to the light emitting diode during the plurality of subframe periods in a first mode corresponding to a display mode,
output only one of the scan signal or the data signal during some subframe periods among the plurality of subframe periods for sensing a pointer light and output the scan signal and the data signal during some other subframe periods among the plurality of subframe periods for displaying, in a second mode,
output only one of the scan signal or the data signal to the light emitting diode during the plurality of subframe periods for sensing a pointer light in a third mode corresponding to a power saving mode or a stand-by mode.

2. The image display apparatus of claim 1, wherein the driving controller is configured to control a forward current to flow on the light emitting diode in the first mode, and control a backward current to flow on the light emitting diode on which the pointer light is incident in the second mode.

3. The image display apparatus of claim 1, wherein the driving controller is configured to display a pointer image corresponding to the pointer light in response to sensing the pointer light in the second mode.

4. The image display apparatus of claim 1, wherein in response to sensing the pointer light in the third mode, the driving controller is configured to display a pointer image corresponding to the pointer light by switching the third mode to the first mode or the second mode.

5. The image display apparatus of claim 1, wherein in a state in which a data line is connected to an anode of the light emitting diode and a scan line is connected to a cathode of the light emitting diode, the driving controller outputs the scan signal and the data signal to the light emitting diode during the plurality of subframe periods in the first mode, and outputs only the scan signal to the light emitting diode during some subframe periods among the plurality of subframe periods in the second mode.

6. The image display apparatus of claim 5, wherein the driving controller outputs only the scan signal to the light emitting diode during the plurality of subframe periods in the third mode.

7. The image display apparatus of claim 1, wherein in a state in which a scan line is connected to an anode of the light emitting diode and a data line is connected to a cathode of the light emitting diode, the driving controller outputs the scan signal and the data signal to the light emitting diode during the plurality of subframe periods in the first mode, and outputs only the data signal to the light emitting diode during some subframe periods among the plurality of subframe periods in the second mode.

8. The image display apparatus of claim 7, wherein the driving controller outputs only the data signal to the light emitting diode during the plurality of subframe periods in the third mode.

9. The image display apparatus of claim 7, further comprising:
a plurality of first switching drivers to supply the scan signal or a voltage at a first level to anodes of the plurality of light emitting diodes based on a switching operation during a period of the first mode;
a plurality of second switching drivers to supply a voltage at a second level lower than the first level to cathodes of the plurality of light emitting diodes based on the switching operation during the period of the first mode;
a first switch to output a scan control signal or the voltage at the first level during the period of the first mode, and not output the scan control signal or the voltage at the first level during a period of the second mode; and
a second switch to output the voltage at the second level during the period of the first mode, and output a current flowing on at least one of the plurality of light emitting diodes based on the pointer light during the period of the second mode.

10. The image display apparatus of claim 9, further comprising:
an amplifier configured to amplify a difference between a first line voltage and a second line voltage based on the current flowing on the light emitting diode during the period of the second mode.

11. The image display apparatus of claim 1, wherein an anode voltage of the light emitting diode on which the pointer light is incident is lower in the period of the second mode than in a period of the first mode, or
a cathode voltage of the light emitting diode on which the pointer light is incident is higher in the period of the second mode than in the period of the first mode.

12. The image display apparatus of claim 10, further comprising:
a sensing interface configured to supply a signal output through the amplifier to the driving controller.

13. The image display apparatus of claim 12, wherein the driving controller is configured to sequentially drive the plurality of first switching drivers and the plurality of second switching drivers during the period of the second mode, and
wherein the sensing interface outputs pointing coordinate information of corresponding to the pointer light based on sequential driving of the plurality of first switching drivers and the plurality of second switching drivers.

14. The image display apparatus of claim 12, wherein the sensing interface outputs intensity information of the pointer light corresponding to a level of the difference between the first line voltage and the second line voltage.

15. The image display apparatus of claim 1, wherein the driving controller controls a period of the first mode to be longer than a period of the second mode in a case in which pointing coordinate information corresponding to the pointer light is not detected during the period of the second mode.

16. The image display apparatus of claim 1, wherein the driving controller controls a period of the first mode to be equal to or shorter than a period of the second mode in a case in which pointing coordinate information corresponding to the pointer light is detected during the period of the second mode.

17. The image display apparatus of claim 1, further comprising:
a signal processing device configured to output an image signal to a display of the image display apparatus,
wherein the signal processing device outputs an image signal including a pointer image to the display based on pointing coordinate information corresponding to the pointer light.

18. A video wall comprising:
a plurality of image display apparatuses,
wherein the image display apparatus includes:
a panel including a plurality of light emitting diodes configured for displaying and for sensing a pointer light; and a driving controller configured to output a scan signal to a light emitting diode of the plurality of light emitting diodes for each of a plurality of subframe periods, wherein the driving controller is configured to:
output a scan signal and a data signal to the light emitting diode during the plurality of subframe periods in a first mode corresponding to a display mode,
output only one of the scan signal or the data signal during some subframe periods among the plurality of subframe periods for sensing a pointer light and output the scan signal and the data signal during some other subframe periods among the plurality of subframe periods for displaying, in a second mode,
output only one of the scan signal or the data signal to the light emitting diode during the plurality of subframe periods for sensing a pointer light in a third mode corresponding to a power saving mode or a stand-by mode.

* * * * *